(12) United States Patent
Smith et al.

(10) Patent No.: US 6,798,612 B2
(45) Date of Patent: Sep. 28, 2004

(54) POWER STRIP DISTRIBUTION SYSTEM AND METHOD FOR AN AUTOMATED ROBOTIC DEVICE IN A DATA STORAGE SYSTEM

(75) Inventors: Frank T. Smith, Nederland, CO (US); Timothy C. Ostwald, Louisville, CO (US); Daniel J. Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 244 days.

(21) Appl. No.: 10/033,944

(22) Filed: Dec. 27, 2001

(65) Prior Publication Data

US 2003/0002202 A1 Jan. 2, 2003

Related U.S. Application Data

(60) Provisional application No. 60/302,248, filed on Jun. 29, 2001.

(51) Int. Cl.$^7$ .............................................. G11B 15/68
(52) U.S. Cl. ........................................................ 360/92
(58) Field of Search .............................. 360/92, 98.04, 360/98.05, 98.06; 369/30.1–30.99, 34.01, 35.01, 36.01

(56) References Cited

U.S. PATENT DOCUMENTS

| | | |
|---|---|---|
| 3,179,063 A | 4/1965 | Case et al. |
| 3,392,244 A | 7/1968 | Hillman |
| 3,729,133 A | 4/1973 | Covert |
| 3,733,446 A | 5/1973 | Colovas et al. |
| 3,881,053 A | 4/1975 | Lemelson |
| 3,970,775 A | 7/1976 | Lemelson |
| 4,087,839 A | 5/1978 | Lemelson |
| 4,846,619 A | 7/1989 | Crabtree et al. |
| 4,928,245 A | 5/1990 | Moy et al. |
| 4,945,429 A | 7/1990 | Munro et al. |
| 5,045,646 A | 9/1991 | Musachio |
| 5,297,484 A | 3/1994 | Piserchia et al. |
| 5,333,982 A | 8/1994 | Tanizawa et al. |
| 5,429,470 A | 7/1995 | Nicol et al. |
| 5,503,260 A | 4/1996 | Riley |
| 5,544,146 A | 8/1996 | Luffel et al. |

(List continued on next page.)

FOREIGN PATENT DOCUMENTS

| | | |
|---|---|---|
| EP | 0 288 165 A2 | 10/1988 |
| EP | 0 289 986 A2 | 11/1988 |
| EP | 0 982 724 A2 | 3/2000 |
| EP | 0 989 550 A1 | 3/2000 |
| EP | 1 056 086 | 11/2000 |
| WO | WO 85/02051 A1 | 5/1985 |

OTHER PUBLICATIONS

"L180 Tape Library, General Information Manual," © 1999 Storage Technology Corp., Louisville, CO.

*Primary Examiner*—Craig A. Renner
(74) *Attorney, Agent, or Firm*—Brooks Kushman P.C.

(57) ABSTRACT

A system and method for distributing electrical power to an automated robotic device for transporting media cartridges in a data storage library. The system and method include a power distribution strip having a substantially planar insulating member with opposed first and second sides, and first and second oppositely charged electrical conductors on the opposed first and second sides for providing power to the robotic device. The system and method also include multiple contacts on the robotic device for contacting the first and second conductors. The multiple contacts include a first pair of contacts for contacting the first conductor and a second pair of contacts for contacting the second conductor. At least one of the first pair of contacts and at least one of the second pair of contacts maintain contact with the first and second conductors, respectively, as the robotic device moves in the library.

20 Claims, 16 Drawing Sheets

U.S. PATENT DOCUMENTS

| | | | |
|---|---|---|---|
| 5,608,275 A | 3/1997 | Khosrowpour |
| 5,646,917 A | 7/1997 | Miyoshi et al. |
| 5,690,197 A | 11/1997 | Suganuma et al. |
| 5,700,125 A | 12/1997 | Falace et al. |
| 5,867,003 A | 2/1999 | Hashimoto et al. |
| 5,870,245 A | 2/1999 | Kersey et al. |
| 5,914,919 A | 6/1999 | Fosler et al. |
| 5,917,253 A | 6/1999 | Rusnack |
| 5,927,464 A | 7/1999 | Clark et al. |
| 5,936,318 A | 8/1999 | Weiler et al. |
| 5,936,796 A | 8/1999 | Haneda |
| 5,993,222 A | 11/1999 | Nicolette et al. |
| 6,011,669 A | 1/2000 | Apple et al. |
| 6,025,972 A | 2/2000 | Schmidtke et al. |
| 6,059,509 A | 5/2000 | Ostwald |
| 6,068,436 A | 5/2000 | Black et al. |
| 6,109,568 A | 8/2000 | Gilbert et al. |
| 6,144,391 A | 11/2000 | Hinson et al. |
| 6,153,999 A | 11/2000 | Borrego |
| 6,175,539 B1 | 1/2001 | Holmquist et al. |
| 6,222,699 B1 | 4/2001 | Luffel et al. |
| 6,230,861 B1 | 5/2001 | Cornic |
| 6,231,291 B1 | 5/2001 | Mueller et al. |
| 6,250,442 B1 | 6/2001 | Perraud et al. |
| 6,259,580 B1 | 7/2001 | Schmidtke et al. |
| 6,262,863 B1 | 7/2001 | Ostwald et al. |
| 6,264,017 B1 | 7/2001 | Evans |
| 6,304,798 B1 | 10/2001 | Carpenter |
| 6,327,519 B1 | 12/2001 | Ostwald et al. |
| 6,360,860 B1 | 3/2002 | van Zijverden et al. |
| 6,381,517 B1 | 4/2002 | Butka et al. |
| 6,396,391 B1 | 5/2002 | Binder |
| 6,404,585 B2 | 6/2002 | Schmidtke et al. |
| 6,441,991 B2 | 8/2002 | Ostwald et al. |
| 6,457,928 B1 | 10/2002 | Ryan |
| 6,473,371 B1 | 10/2002 | White |
| 6,480,759 B1 | 11/2002 | Ostwald et al. |
| 6,488,462 B1 | 12/2002 | Williams |
| 6,490,122 B1 | 12/2002 | Holmquist et al. |
| 6,510,020 B1 | 1/2003 | Holmquist et al. |

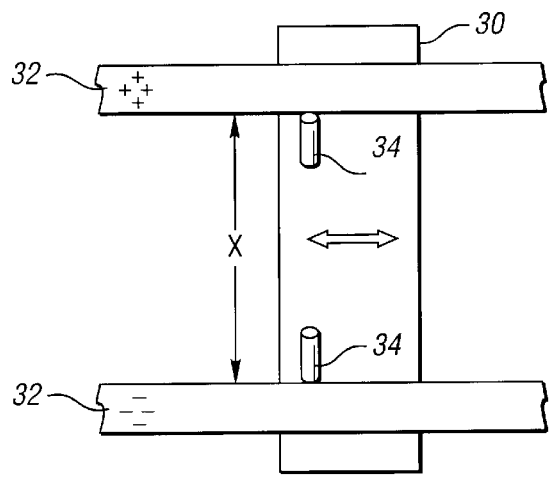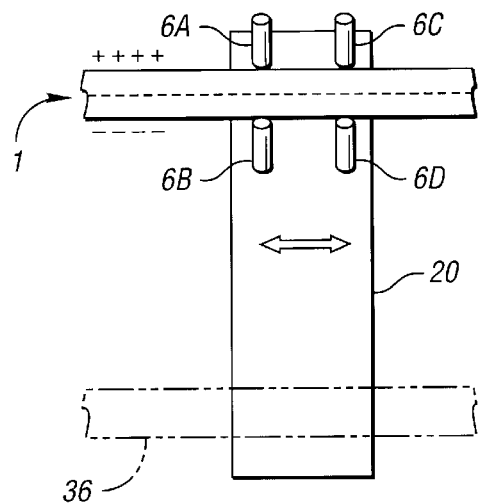
*Fig. 3a*
*(PRIOR ART)*
*Fig. 3b*
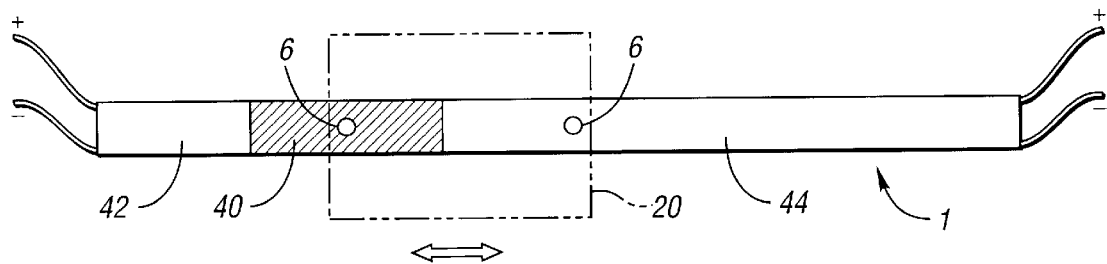
*Fig. 4a*
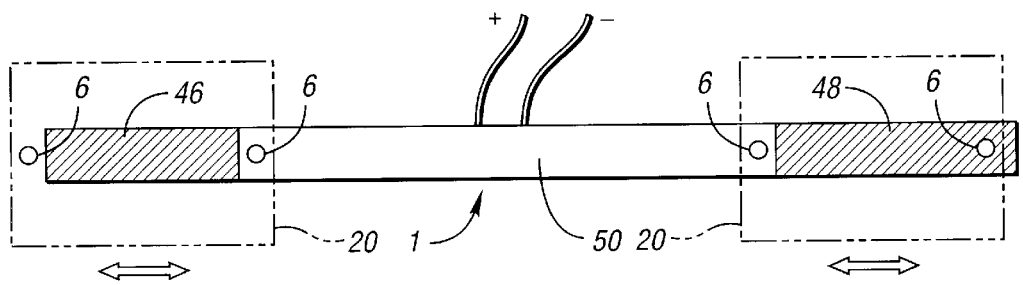
*Fig. 4b*

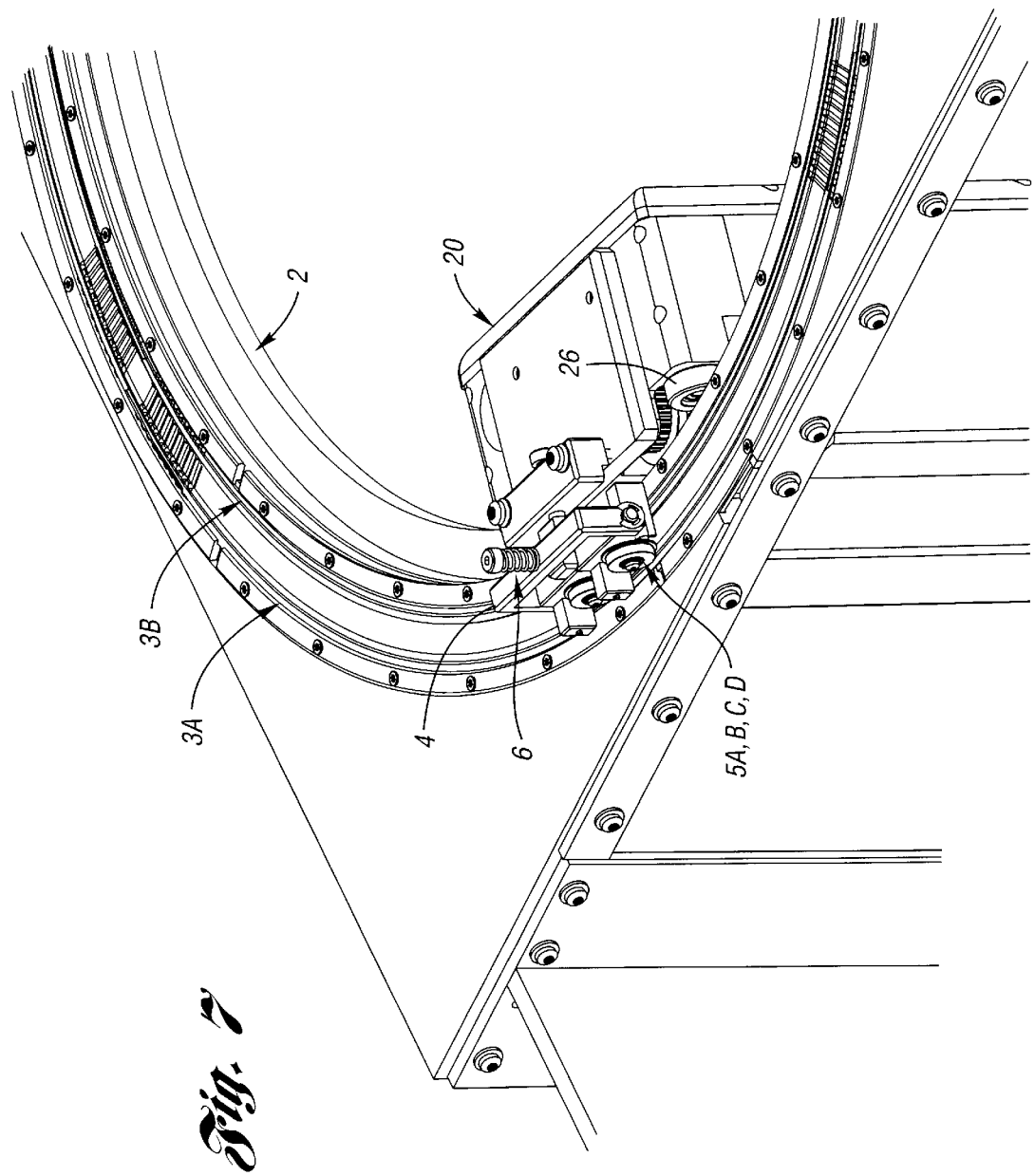

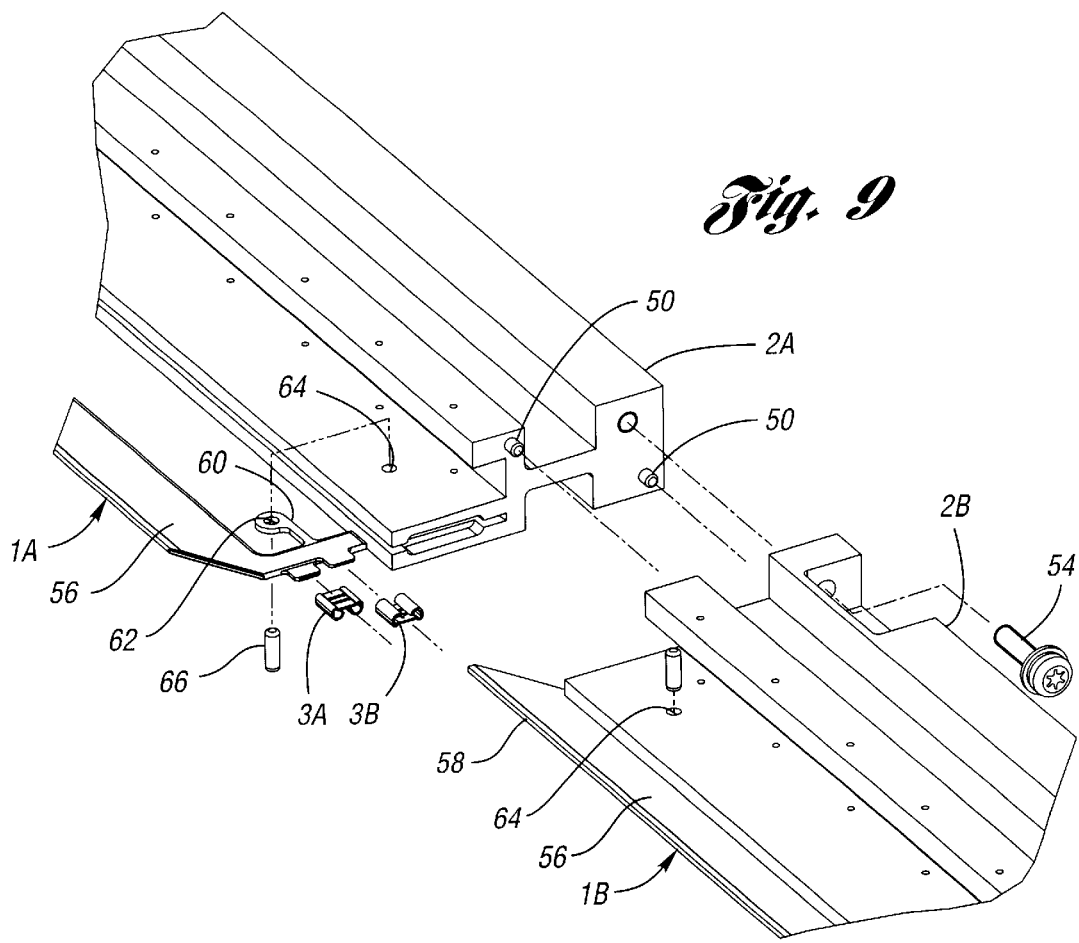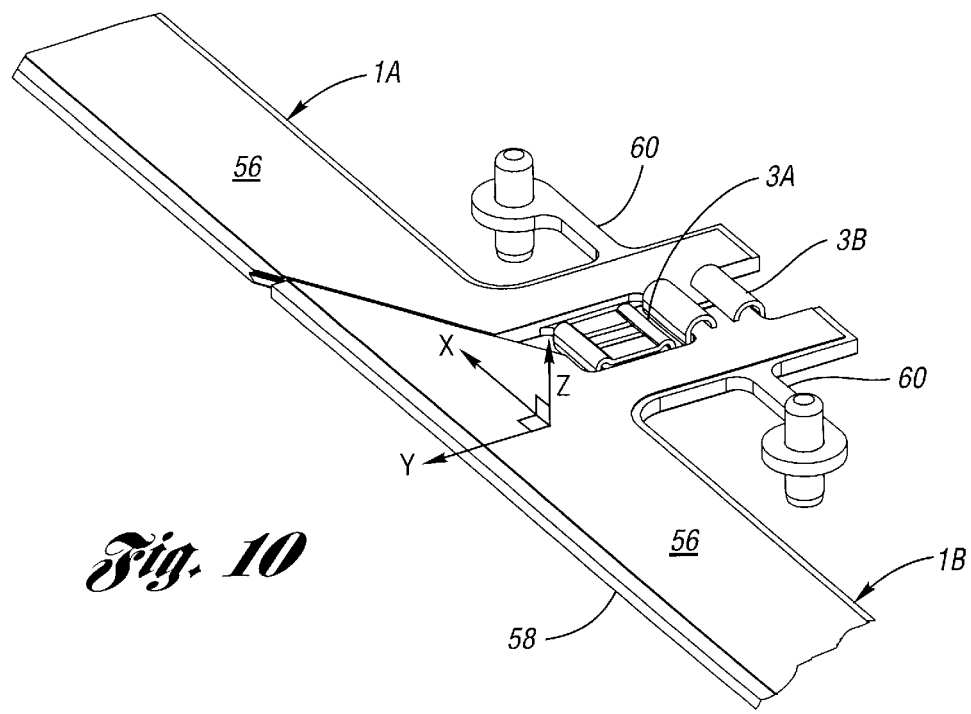

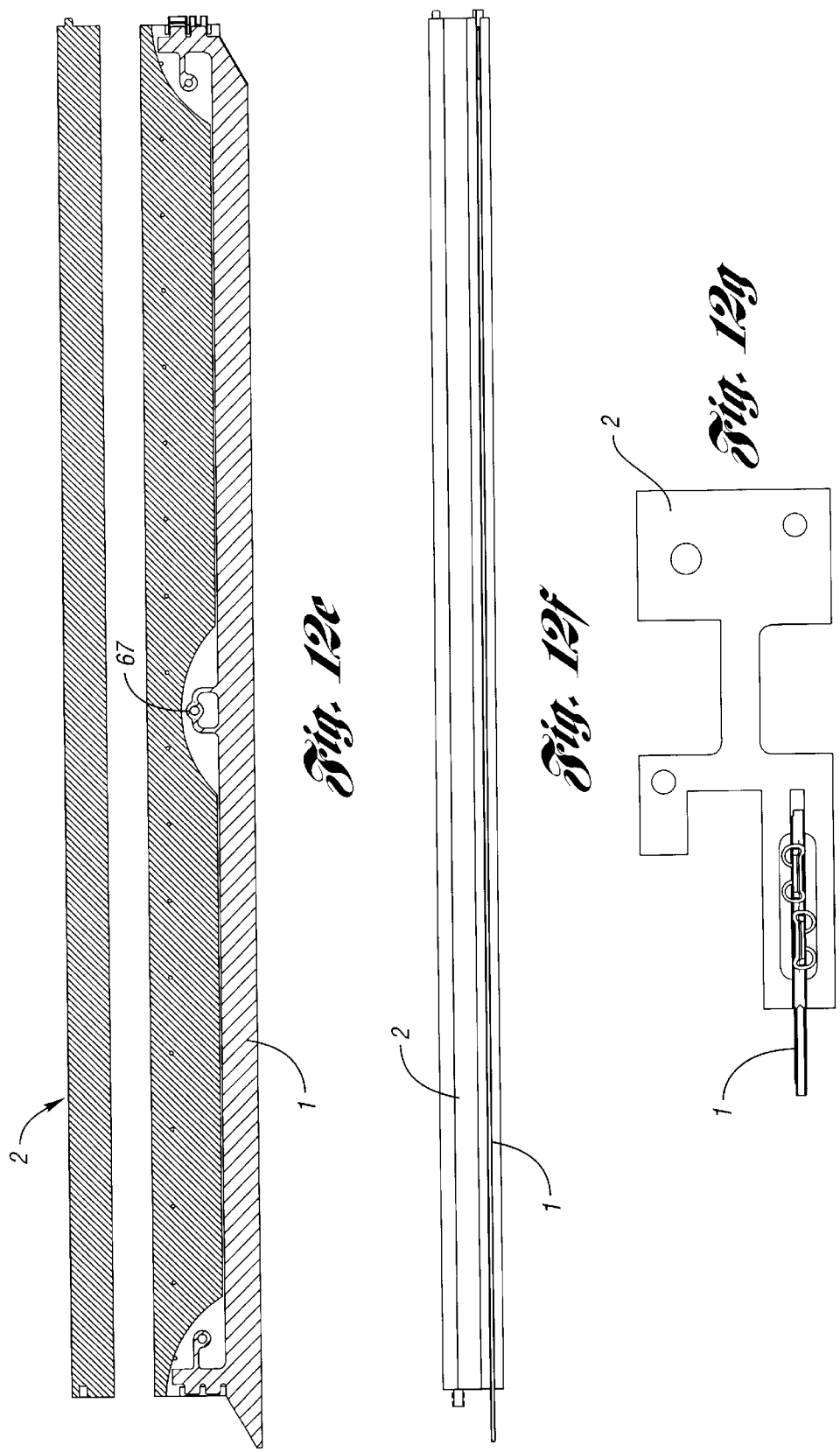

POWER STRIP DISTRIBUTION SYSTEM AND METHOD FOR AN AUTOMATED ROBOTIC DEVICE IN A DATA STORAGE SYSTEM

CROSS-REFERENCE TO RELATED APPLICATIONS

This application claims the benefit of U.S. provisional application Ser. No. 60/302,248 filed Jun. 29, 2001.

BACKGROUND OF THE INVENTION

1. Field of the Invention

The present invention relates generally to the distribution of power in a data storage system and, more particularly, to a power distribution system and method for an automated robotic device for use in a tape cartridge library system.

2. Background

Current automated libraries for tape cartridges typically include arrays of multiple storage cells housing the tape cartridges, as well as multiple media drives. Multiple automated robotic devices may be used to move tape cartridges between the various storage cells and media drives within a library.

The use of multiple robotic devices in automated tape cartridge libraries raises various problems concerning the distribution of power to such robotic devices. More particularly, robotic devices used in automated tape cartridge libraries require power for operation thereof. In prior art automated tape cartridge libraries, the movement of the robotic devices is restricted by wire cable connections used for providing such power. That is, such cabling can prevent the robotic devices from crossing paths, or from continuous movement in one direction around the library without the necessity of ultimately reversing direction.

Thus, there exists a need for an improved system and method for distributing power to robotic devices used in automated data storage libraries, such as tape cartridge libraries. Such an improved system and method would overcome the problems described above through the use of brush/wiper technology. A robotic device traveling over a given route may use a power distributor such as fixed conductive strips or rails to supply power to the robotic device, which itself is provided with brushes or wipers, or conductive wheels and brushes that contact the conductive strips or rails in order to conduct power to the robotic device. Multiple brush or wheel pairs are preferably used on each robotic device to improve robustness and reliability. The integration of such conductive strips or rails into the automated tape cartridge library, in conjunction with brush or wheel contacts provided on the robotic devices, allows for greater freedom of movement of the robotic devices, as well as for modular and extensible power distribution to robotic devices as library configurations change, or as libraries are connected in a modular fashion to form library systems.

SUMMARY OF THE INVENTION

Accordingly, the present invention provides for an improved power distribution system and method for an automated robotic device for use in a data storage library.

According to the present invention, then, in a data storage library having a plurality of cells for holding media cartridges for use in storing data, at least one media drive, and a robotic device for transporting cartridges between the plurality of cells and the at least one media drive in the data storage library, a system is provided for distributing electrical power to the automated robotic device. The system comprises a power distribution strip comprising a substantially planar insulating member having opposed first and second sides, and first and second electrical conductors on the opposed first and second sides, respectively, for providing electrical power to the automated robotic device, the first and second conductors to be provided with opposite electrical charges. The system further comprises a plurality of contacts on the automated robotic device for making electrical contact with the first and second conductors, the plurality of contacts comprising a first pair of contacts for making electrical contact with the first conductor and a second pair of contacts for making electrical contact with the second conductor, wherein at least one of the first pair of contacts and at least one of the second pair of contacts maintain contact with the first and second conductors, respectively, as the automated robotic device moves in the data storage library.

Also according to the present invention, in a data storage library having a plurality of cells for holding media cartridges for use in storing data, at least one media drive, and a robotic device for transporting cartridges between the plurality of cells and the at least one media drive in the data storage library, a method is provided for distributing electrical power to the automated robotic device. The method comprises providing a power distribution strip comprising a substantially planar insulating member having opposed first and second sides, and first and second electrical conductors on the opposed first and second sides, respectively, for providing electrical power to the automated robotic device, the first and second conductors to be provided with opposite electrical charges. The method further comprises providing a plurality of contacts on the automated robotic device for making electrical contact with the first and second conductors, the plurality of contacts comprising a first pair of contacts for making electrical contact with the first conductor and a second pair of contacts for making electrical contact with the second conductor, wherein at least one of the first pair of contacts and at least one of the second pair of contacts maintain contact with the first and second conductors, respectively, as the automated robotic device moves in the data storage library.

The above features, and other features and advantages of the present invention are readily apparent from the following detailed descriptions thereof when taken in connection with the accompanying drawings.

BRIEF DESCRIPTION OF THE DRAWINGS

FIG. 3a is a simplified block diagram of a robotic device for use in an automated tape cartridge library according to the prior art;

FIG. 3b is a simplified a block diagram of a robotic device for use in an automated tape cartridge library having brush and strip power distribution according to the present invention;

FIGS. 4a and 4b are simplified overhead block diagrams of a power strip and robotic device with conductive brushes for use in an automated tape cartridge libraries according to the present invention;

FIG. 7 is another more detailed perspective view of a robotic device for use in an automated tape cartridge library having brush and wheel power distribution according to the present invention;

FIG. 9 is an exploded perspective view of power strip and guide rail joint for use in an automated tape cartridge library according to the present invention;

FIG. 10 is a perspective view of a power strip joint for use in an automated tape cartridge library according to the present invention;

FIGS. 12c–g are cross-sectional and side views of a power strip and guide rail assembly for use in an automated tape cartridge library according to the present invention;

DETAILED DESCRIPTION OF THE PREFERRED EMBODIMENT(S)

With reference to the Figures, the preferred embodiments of the present invention will now be described in greater detail. The present application incorporates by reference herein commonly owned U.S. patent application Ser. Nos. 10/033,867, 10/034,972, 10/034,904, 10/033,942, and 10/034,584, all filed on the same date as the present application.

As previously noted, current automated libraries for tape cartridges typically include arrays of multiple storage cells housing the tape cartridges, as well as multiple media drives. Multiple automated robotic devices may be used to move tape cartridges between the various storage cells and media drives within a library.

As also noted previously, the use of multiple robotic devices in automated tape cartridge libraries raises various problems concerning the distribution of power to such robotic devices. More particularly, robotic devices used in automated tape cartridge libraries require power for operation thereof. In prior art automated tape cartridge libraries, the movement of the robotic devices is restricted by wire cable connections used for providing such power. That is, such cabling can prevent the robotic devices from crossing paths, or from continuous movement in one direction around the library without the necessity of ultimately reversing direction.

Such problems can be overcome through the use of brush/wiper technology. A robotic device traveling over a given route may use a power distributor such as fixed conductive strips or rails to supply power to the robotic device, which itself is provided with brushes or wipers, or wheels and brushes that contact the conductive strips or rails in order to conduct power to the robotic device. Multiple brush or wheel pairs are preferably used on each robotic device to improve robustness and reliability. The integration of such power distributors, which also may be referred to as power distribution strips or power distribution rail assemblies, into the automated tape cartridge library, in conjunction with brush or wheel contacts provided on the robotic devices, allows for greater freedom of movement of the robotic devices, as well as for modular and extensible power distribution to robotic devices as library configurations change, or as libraries are connected in a modular fashion to form library systems.

Figure 1:
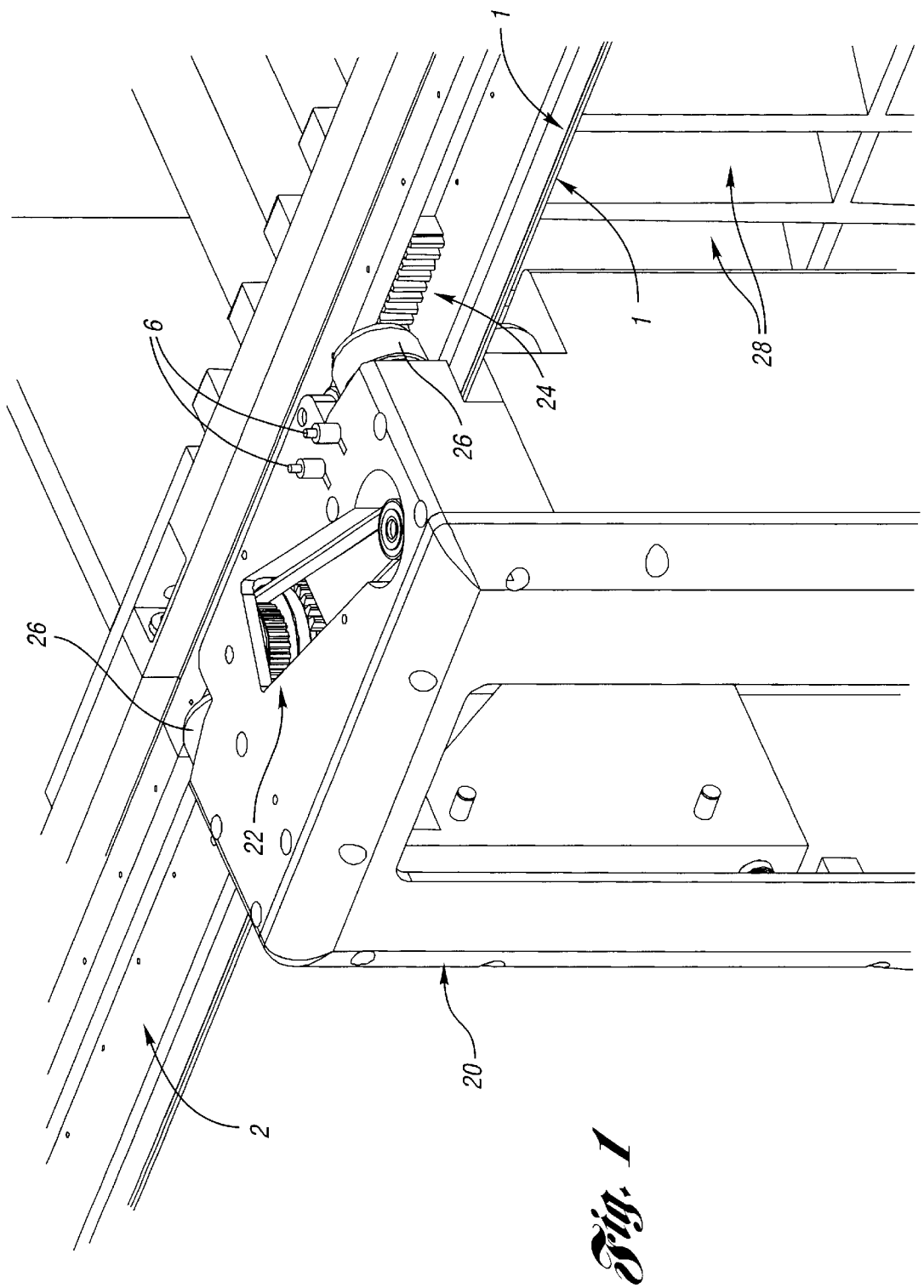
FIG. 1 is a perspective view of a robotic device for use in an automated tape cartridge library having brush and strip power distribution according to the present invention.
Figure 2A:
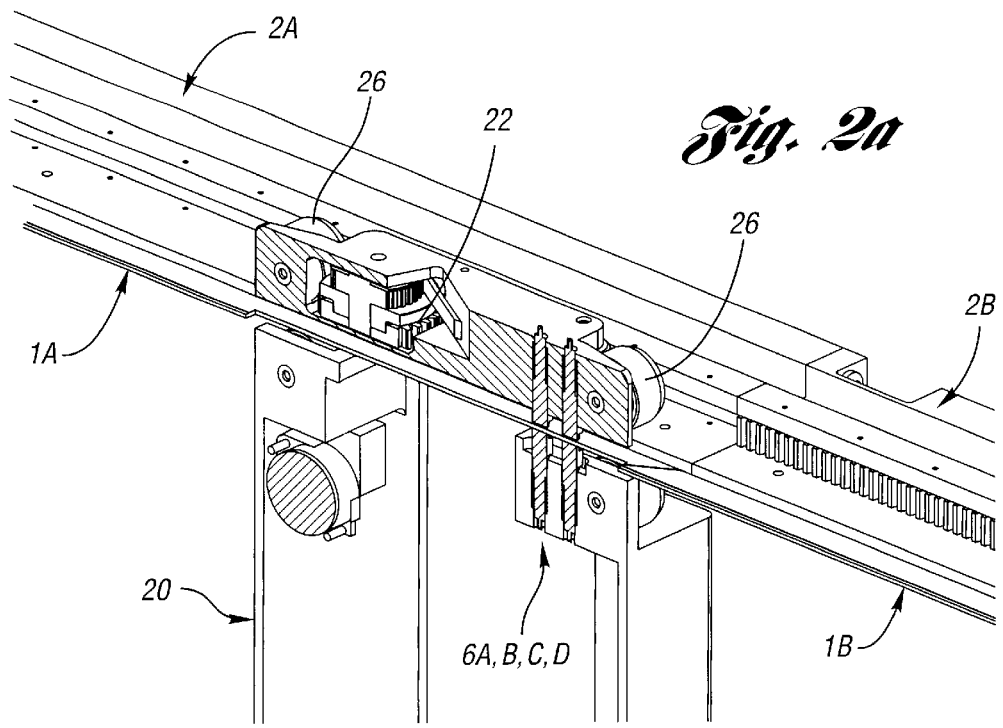
FIGS. 2a and 2b are partial cross-sectional views of a robotic device for use in an automated tape cartridge library having brush and strip power distribution according to the present invention.
Figure 2B:
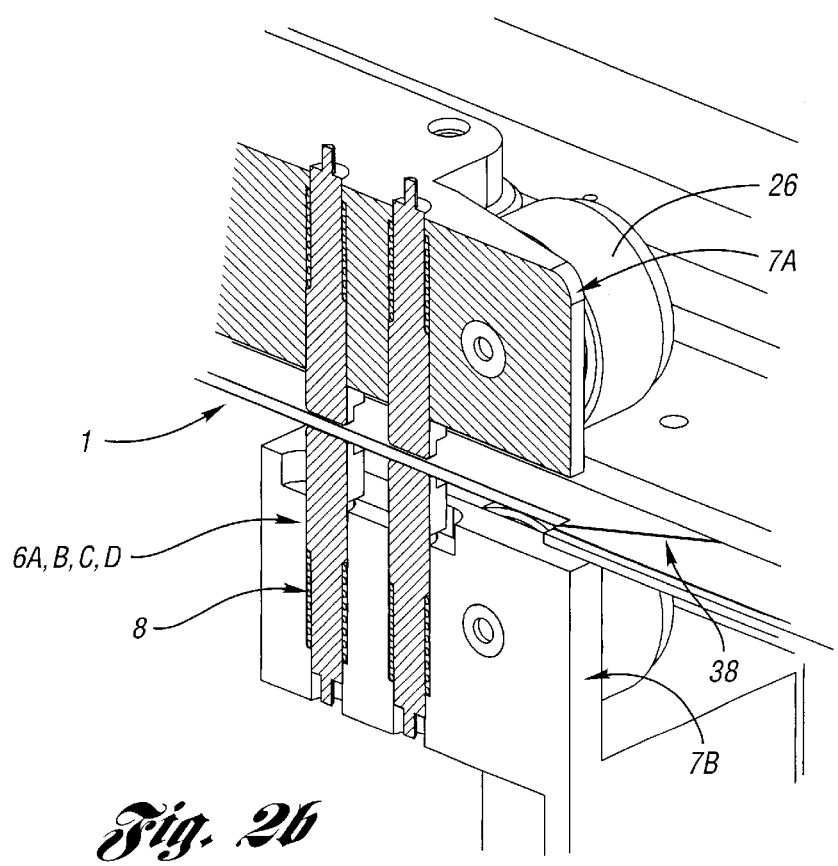

FIGS. 1 and 2a–b show perspective and cross-sectional views, respectively, of a robotic device for use in an automated tape cartridge library having brush and strip power distribution according to the present invention. As seen therein, a moveable robotic device (20), which may be referred to as a "handbot" or "picker," is supported by a guide structure or rail (2) preferably having an integrated power strip (1). Guide rail (2) and/or power strip (1) may also be referred to as a track. Power strip (1) is a substantially planar elongated member, preferably comprising back-to-back conductive surfaces (1A, 1B), preferably copper, separated by a dielectric (preferably FR4) in a sandwich-like configuration. As described in greater detail below, such a configuration provides for improved impedance control. Power strip (1) may be a printed circuit board wherein copper conductors are laminated, glued or etched onto a substrate material. Alternatively, power strip (1) may comprise copper foil tape glued or laminated onto plastic material, or copper inserts molded into a moldable plastic material. Any other methods of construction or configurations known to those of ordinary skill may also be used.

Robotic device (20) includes brush contacts (6A, 6B, 6C, 6D) for providing power to robotic device (20). In that regard, the back-to-back conductive surfaces (1A, 1B) of power strip (1) are oppositely charged. An upper brush (6A) in contact with one conductive surface (1A), in conjunction with a corresponding lower brush (6B) in contact with the opposite conductive surface (1B) thereby supply power to the robotic device (20). Brushes (6A, 6B, 6C, 6D) are contained in housing assembly (7A, 7B) and, to ensure that contact between brushes (6A, 6B, 6C, 6D) and power strip (1) is maintained, brushes (6A, 6B, 6C, 6D) are spring loaded (8). Multiple or redundant pairs of such upper and lower brushes (6A, 6B, 6C, 6D) are preferably provided, and preferably spring loaded (8) independently, to improve robustness and reliability in the event of a brush failure, momentary loss of contact at one or more brushes due to any track irregularities, including seams or joints therein, or voltage irregularities between adjacent power strips (1). Moreover, brushes (6A, 6B, 6C, 6D) preferably have a circular cross-section, such as is provided by a cylindrical shaped brush (6A, 6B, 6C, 6D), as these are better able to traverse a joint or seam (38) in the power strip (1), which may more readily impede or catch a square shaped brush. In that regard, as best seen in FIGS. 2a and 2b, brushes (6A, 6B, 6C, 6D) preferably have a substantially flat surface for contacting the conductive surfaces (1A, 1B) of power strip (1).

Power supplied to robotic device (20) through power strip (1) and brushes (6) powers a motor (not shown) in robotic device (20), which in turn drives a belt and gear system (22). Guide rails (2) includes teeth (24) which cooperate with belt and gear system (22) to permit robotic device (20) to move back and forth along guide rails (2) via guide wheels (26). In that regard, it should be noted that power strip (1) preferably provides DC power to robotic device (20). As seen in FIG. 1, robotic device (20) may thereby gain access to tape cartridges stored in library cells (28) located adjacent guide rail (2). It should also be noted that while only a single robotic device (20) is depicted, power strip (1) is preferably suitable, according to any fashion known in the art, to provide power to multiple robotic devices. In that regard, each robotic device (20) is suitably equipped with a circuit breaker (not shown) in any fashion known in the art in order to isolate the robotic device (20) from the power strip (1) in the event that the robotic device short circuits. In such a manner, the failure of the entire power strip (1) is prevented.

Referring now to FIG. 3a, a simplified block diagram of a robotic device for use in an automated tape cartridge library according to the prior art is shown. As seen therein, a prior art robotic device (30) in an automated tape cartridge library has a pair of spaced apart, oppositely charged power rails (32). The robotic device (30) is provided with a pair of brush contacts (34) for supplying power from two power rails (32) to the robotic device (30), in order to allow movement of the robotic device (30). As seen in FIG. 3a, the large distance, x, between a cooperating pair of brushes (34) creates uneven wear on the brushes (34) due to construction tolerances in the robotic device (30) and the track or power rails (32). Brushes (34) also causes uneven drag on the robotic device (30) by creating a moment load resulting from the separation, x, between the brush (34) and power rail (32) friction points.

FIG. 3b is a simplified a block diagram of a robotic device for use in an automated tape cartridge library having brush and strip power distribution according to the present invention. As seen therein, in contrast to the prior art configuration of FIG. 3a, power is supplied to the robotic device (20) through the power strip (1) and brush (6) configuration described in connection with FIGS. 1 and 2a–b, thereby facilitating the elimination of the large separation between a pair of cooperating brushes (6A, 6B), and the accompanying problems, and allowing for lower construction tolerance requirements. The single rail construction, two-sided power strip (1) and brush (6) configuration also acts to reduce costs and provides for a more integrated assembly. As seen in FIG. 3b, an optional, non-powered lower guide rail (36) may also be provided for robotic device (20). It should also be noted that the copper foil tape that may be used in the construction of the power strip (1) may be installed in the field during the assembly of the automated tape cartridge library. In such a fashion, it may be possible to eliminate all electrical joints in power strip (1) by using a continuous copper foil strip.

FIGS. 4a and 4b are simplified overhead block diagrams of a power strip (1) and robotic device (20) with conductive brushes (6) for use in an automated tape cartridge libraries according to the present invention. As seen in FIG. 4a, power strips (1) may be fed power from both ends thereof, or multiple sections of power strips may be fed from both ends. Robotic device (20) is preferably provided with multiple pairs of cooperating brush contacts (6), only the top brushes in each cooperating pair being visible in FIG. 4a. In that regard, with reference again to FIGS. 2a and 2b, it should also be noted that brush pairs on each side of power strip (1) are oriented so as to follow the same path. That is, a pair of brushes (6) contacting the same conductive surface (1A, 1B) are aligned so that both such brushes (6) contact the same part of the conductive surface (1A, 1B) as robotic device (20) moves in the library. Such a brush orientation facilitates the creation of a beneficial oxide layer on the conductive surfaces (1A, 1B). As will be discussed in greater detail below, such an oxide layer helps reduce both electrical and sliding resistance between the brushes and the conductive surfaces (1A, 1B).

Referring still to FIGS. 4a and 4b, cooperating brush pairs are preferably spaced apart on robotic device (20). Such spacing, as well as the use of multiple cooperating brush pairs provides for greater robustness and freedom of movement for robotic device (20) in the event of track irregularities, including unevenness or "dead" track sections. In that regard, as seen in FIG. 4a, a nonpowered or "dead" section (40) of power strip (1) will not necessarily prevent robotic device (20) from traversing the full extent of the power strip (1). That is, as the robotic device (20) moves across the dead track section (40), one cooperating pair of brushes always maintains contact with a powered track section (42, 44). Similarly, as seen in FIG. 4b, power strip (1) may be fed power from a more centralized region thereof. As a result of the separation of cooperating pairs of brush contacts, robotic device (20) may be able to traverse longer distances than the length of power strip (1) onto and off of non-powered end-of-track sections (46, 48), provided at least one cooperating pair of brushes maintain contact with powered track section (50). Moreover, in such a fashion, non-powered track sections may be provided where a robotic device (20) may be deliberately driven off power strip (1) and thereby powered down for service.

Figure 4C:
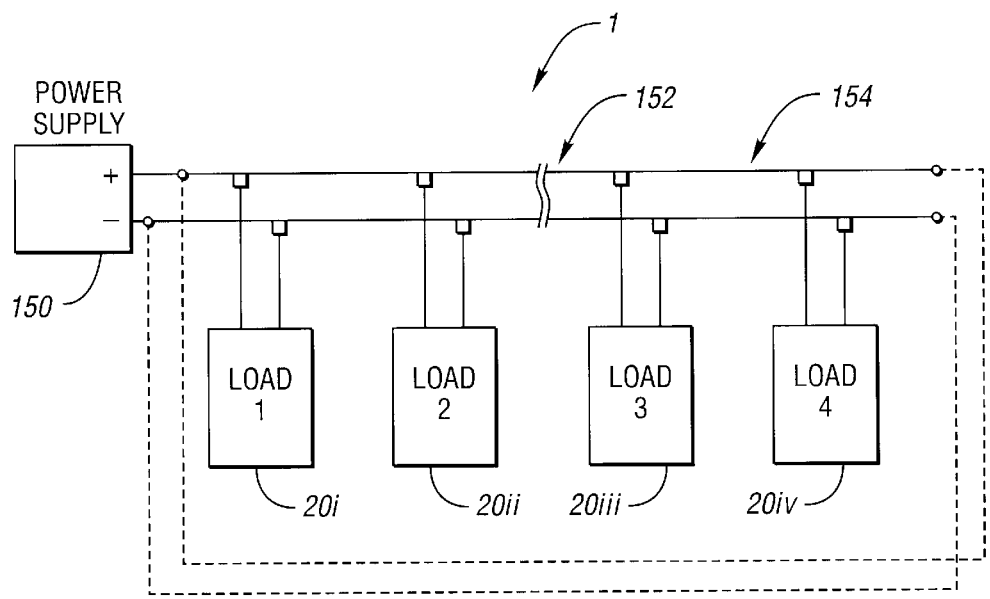
FIGS. 4c and 4d are simplified electrical schematics depicting power supply redundancy schemes according to the present invention.
Figure 4D:
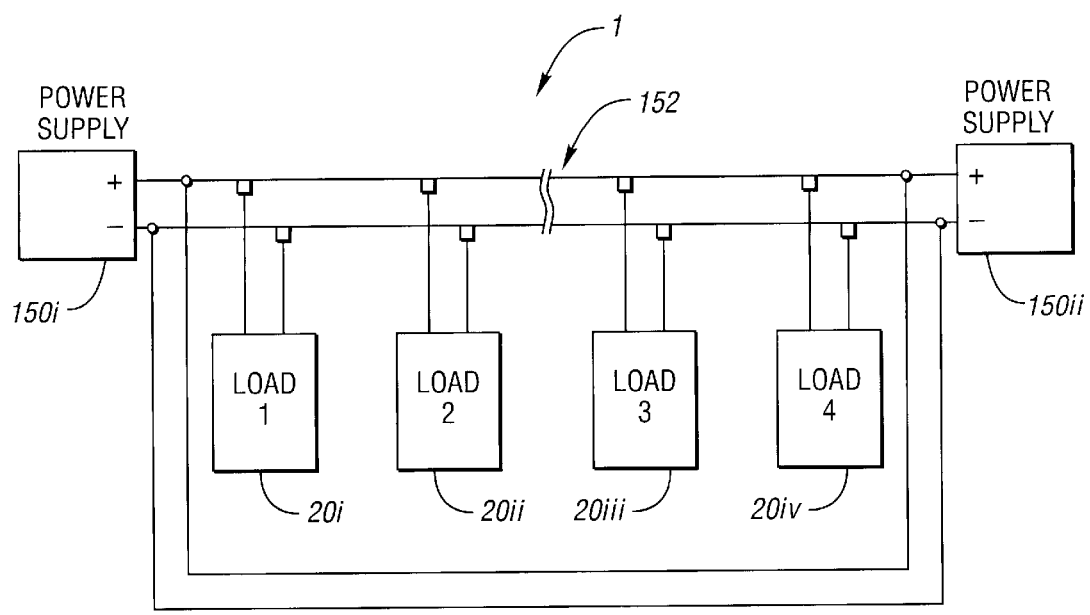
Figure 5:
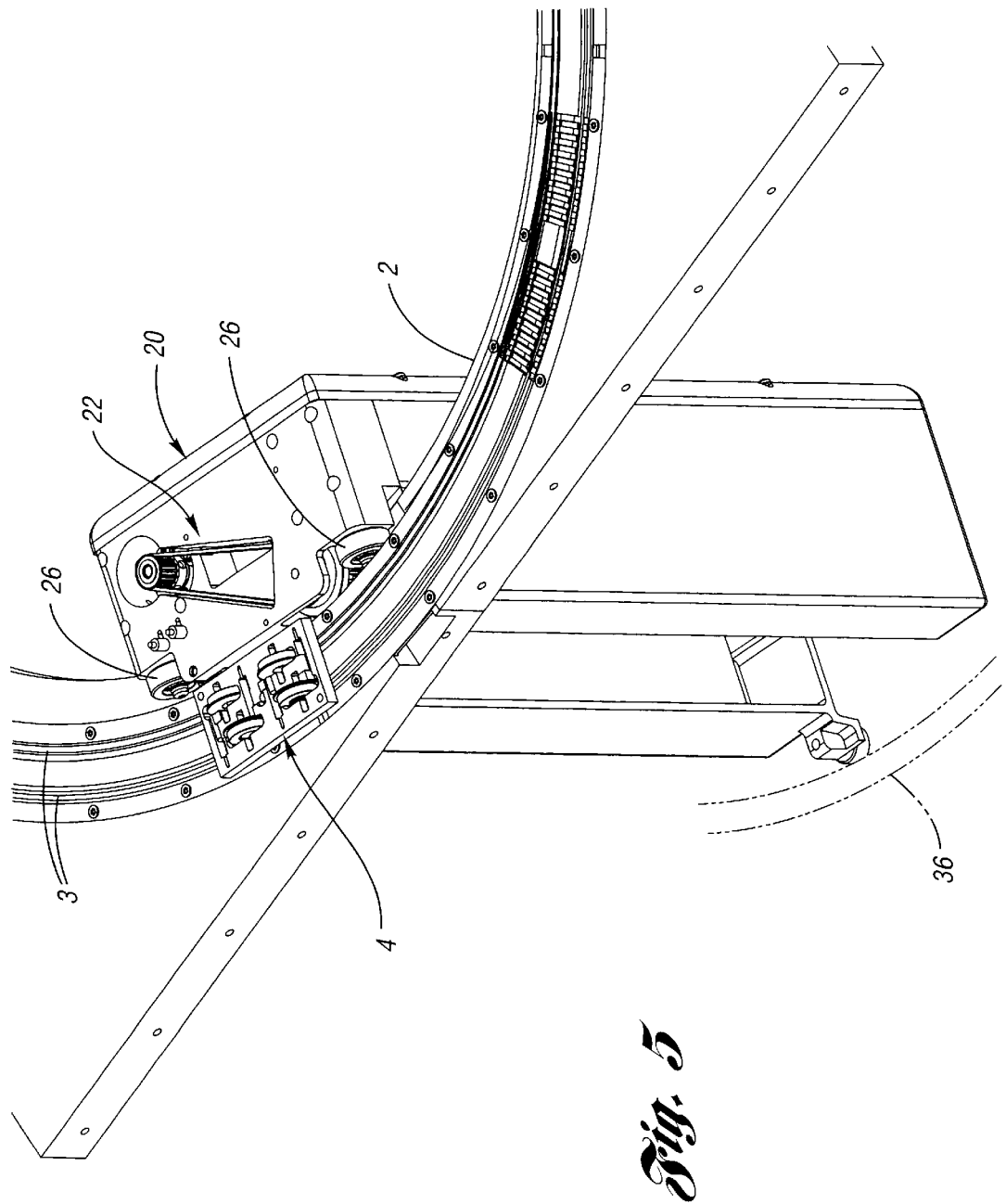
FIG. 5 is a perspective view of a robotic device for use in an automated tape cartridge library having brush and wheel power distribution according to the present invention.
Figure 6:
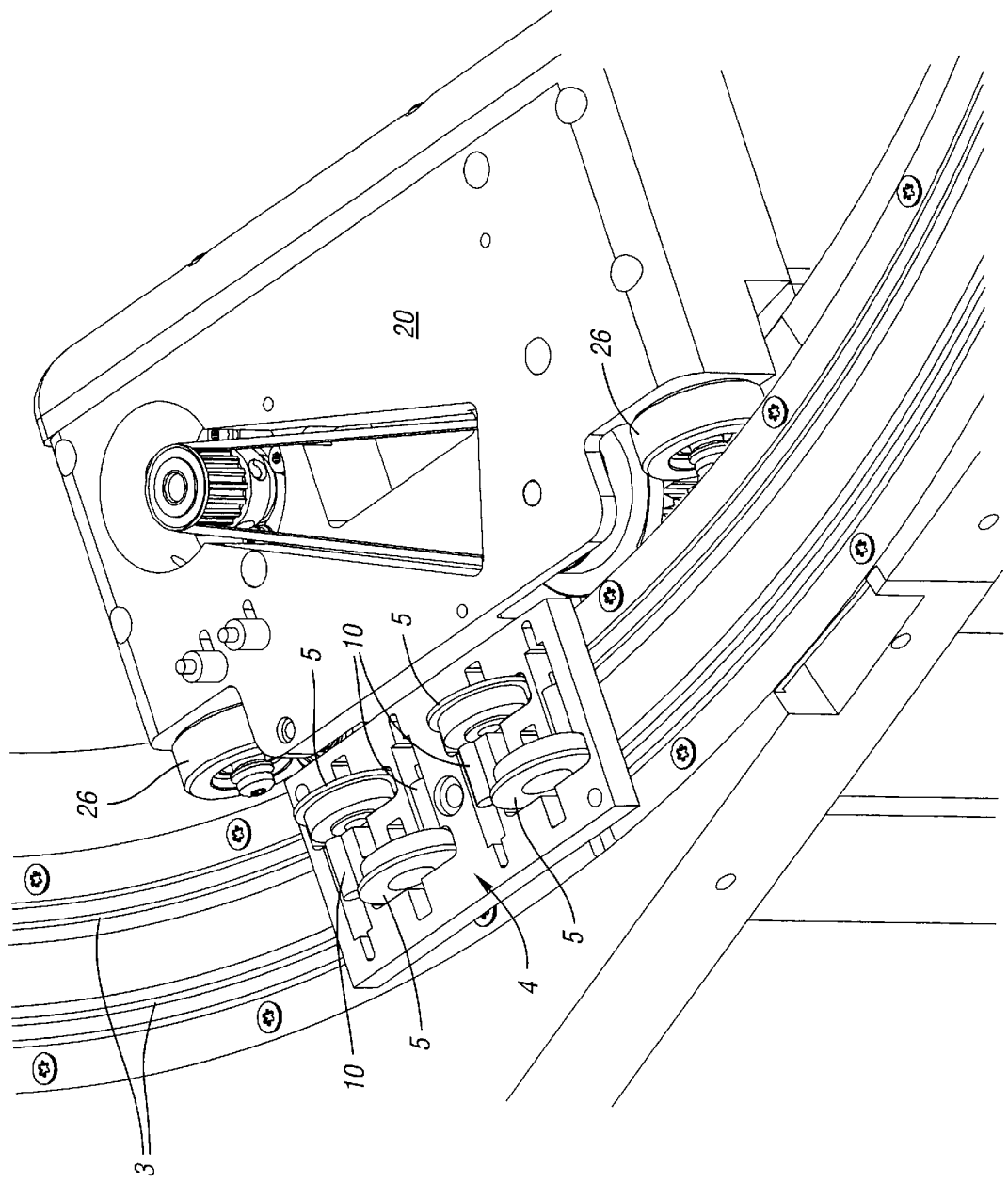
FIG. 6 a more detailed perspective view of a robotic device for use in an automated tape cartridge library having brush and wheel power distribution according to the present invention.
Figure 8A:
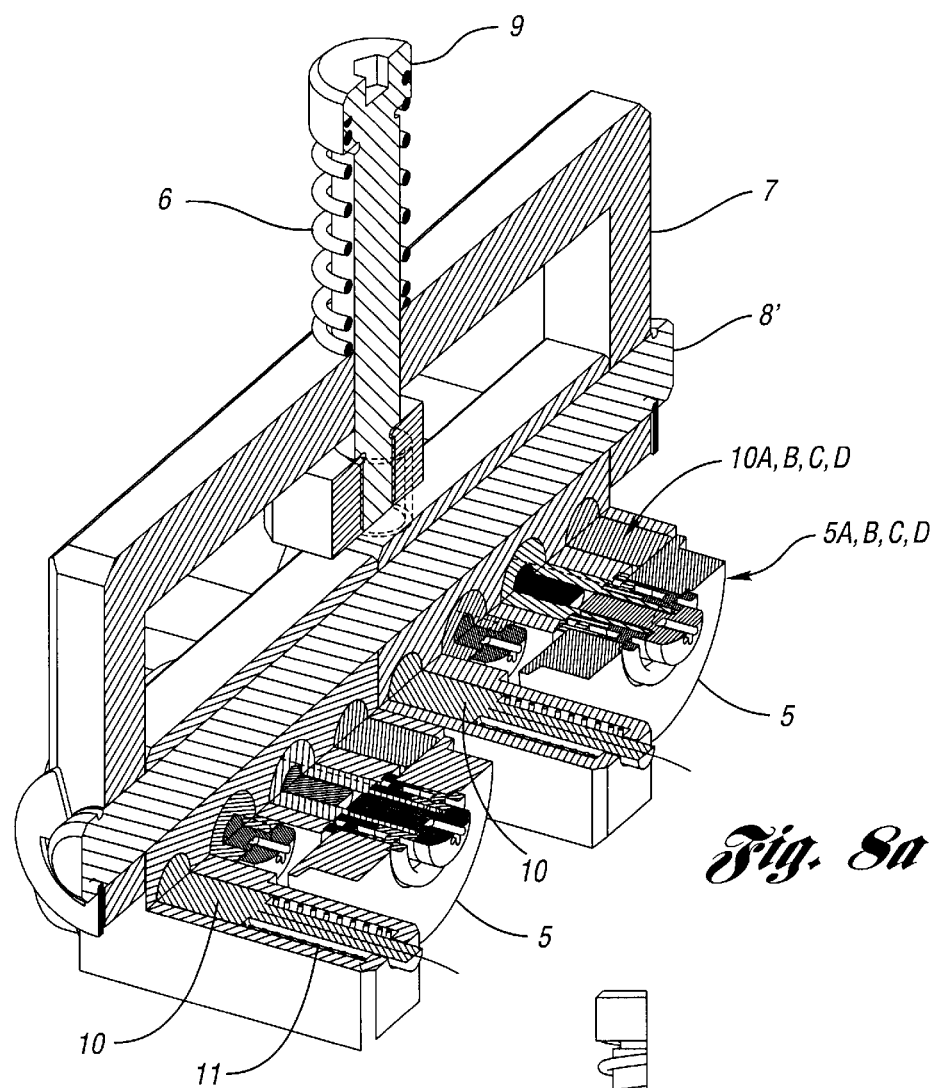
FIGS. 8a and 8b are side and cross-sectional views, respectively, of a brush and wheel mechanism for power distribution to a robotic device in an automated tape cartridge library according to the present invention.
Figure 8B:
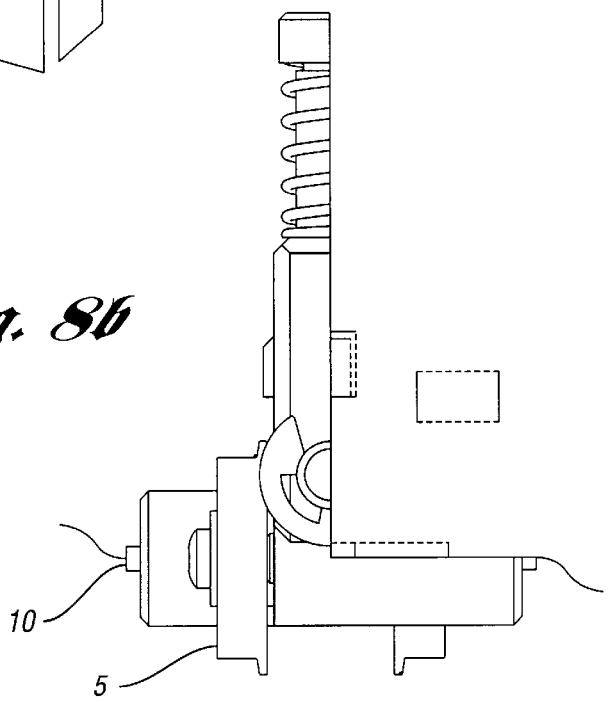

In that same regard, FIGS. 4c and 4d depict simplified electrical schematics of power supply redundancy schemes according to the present invention. As seen in FIG. 4c, in a brush and strip power distribution system, failure of a power supply (150) or a break (152) in the electrical continuity in a power strip (1) will cause a power interruption. Such an electrical discontinuity (152) in turn will result in a loss of power to all of the robotic devices (20i, 20ii, 20iii, 20iv) connected to the conductor. More specifically, such an electrical break (152) will result in the loss of power to those devices (20iii, 20iv) located on the disconnected side (154) of the strip (1). As will be described in greater detail below, a brush a strip power distribution system may be implemented using many interconnected segments or sections to create power strip (1). Each interconnect substantially increases the possibility that power to part or all of the power strip (1) may be interrupted.

The present invention is designed to substantially improve the reliability of such a power distribution system by ensuring that the failure of a single power supply or an electrical break in power strip (1) will not interrupt operation of the automated robotic library. More specifically, as seen in FIG. 4d, the present invention preferably provides for connecting two power supplies (150i, 150ii), rather than one, to power strip (1). In the preferred embodiment shown in FIG. 4d, the two power supplies (150i, 150ii) are positioned at the two ends of power strip (1), and electrically connected to both ends of power strip (1). The power supplies (150i, 150ii) are preferably of the redundant/load sharing type.

When both supplies (150i, 150ii) are active and functioning normally, they share the load created by robotic devices (20i, 20ii, 20iii, 20iv) nearly equally. In the event, however, that one power supply (e.g., 150i) fails, the remaining power supply (e.g., 150ii) automatically begins to source power to all of the devices (20i, 20ii, 20iii, 20iv) connected to the power strip (1). Moreover, in the event of an electrical discontinuity or break (152) in the power strip (1), each power supply (150i, 150ii) will continue to deliver power to the devices (20i, 20ii, 20iii, 20iv) located on that power supply's (150i, 150ii) respective side of the break (152). Alternatively, as shown in dashed line fashion in FIG. 4c, single power supply (150) may be configured to supply power to both ends of power strip (1), thereby ensuring that a break (152) in power strip (1) will not result in loss of power to any of robotic devices (20i, 20ii, 20iii, 20iv). It should be noted that while shown in FIGS. 4c and 4d as electrically connected at the ends of power strip (1), power supplies (150, 150i, 150ii) may alternatively and/or additionally be electrically connected to any other point or points on power strip (1). That is, in a power strip (1) comprising a plurality of electrically interconnected sections or segments, power supplies (150, 150i, 150ii) may be electrically connected to any number of sections anywhere along power strip (1). It should also be noted that the power supply redundancy schemes depicted in FIGS. 4c and 4d are equally suitable for use in the brush and wheel power distribution system described in detail immediately below.

Referring next to FIGS. 5 through 8a and 8b, various perspective, side and cross-sectional views of a robotic device for use in an automated tape cartridge library having brush and wheel power distribution according to the present invention are shown. As seen therein, in this alternative embodiment, robotic device (20) is supported by a guide rail (2), which is provided with a pair of oppositely charged power conductors (3), preferably in the form of copper rails. Power rails (3) supply power to robotic device (20) through power transmission carriage assembly (4). Power supplied to robotic device (20) via power rails (3) and power transmission carriage (4) powers a motor (not shown), which in turn drives belt and gear mechanism (22) to permit robotic device (20) to move back and forth along guide rail (2) via guide wheels (26). In that regard, it should be noted that power rails (3) may provide either AC or DC power to robotic device (20). It should also be noted again that while only a single robotic device (20) is depicted, power rails (3) are preferably suitable, according to any fashion known in the art, to provide power to multiple robotic devices. As described above in connection with the brush and stip power distribution, each robotic device (20) is suitably equipped with a circuit breaker (not shown) in any fashion known in the art in order to isolate the robotic device (20) from the power rails (3) in the event that the robotic device short circuits. In such a manner, the failure of the power rails (3) is prevented.

Power transmission carriage (4) includes multiple cooperating pairs of conduction wheels (5A, 5B, 5C, 5D) (preferably copper), the individual members of a cooperating pair provided in contact, respectively, with oppositely charged conductor rails (3). Conductive brushes (10A, 10B, 10C, 10D) are provided to contact conduction wheels (5A, 5B, 5C, 5D) and are spring loaded (11), preferably independently, to maintain such contact. To maintain contact between conduction wheels (5A, 5B, 5C, 5D) and conductor rails (3), power transmission carriage (4) also includes vertical pre-load spring (6). Power transmission carriage (4) still further includes gimbal arm (7) with pivot shaft (8') and pivot screw (9) for carriage compliance. Once again, multiple or redundant conduction wheel (5A, 5B, 5C, 5D) and conductive brush (10A, 10B, 10C, 10D) pairs are preferably provided, and preferably spring loaded (11) independently, to improve robustness and reliability in the event of a brush failure, momentary loss of contact at one or more wheels due to any track irregularities, including seams or joints therein, or voltage irregularities between adjacent power rails (3). In that same regard, while a single vertical pre-load spring (6) is shown, each conduction wheel (5A, 5B, 5C, 5D) could also be independently spring loaded to maintain contact with conductor rails (3), thereby allowing for better negotiation of any track irregularities or imperfections, including joints or seams.

The brush and wheel embodiment can reduce particulate generation which may accompany the brush and power strip embodiment as a result of brushes negotiating imperfectly aligned track joints. Moreover, because of the more contained nature of the contact between a brush and wheel as opposed to between a brush and extended power stip, any such particulate generation can be more easily contained in the brush and wheel embodiment, such as through the use of a container (not shown) surrounding the brush and wheel to capture any particulate. The brush and wheel embodiment also provides for improved negotiation of joints by a robotic device as it provides for wheels rolling rather than brushes sliding over a joint. As a result, less strict tolerances are required for joint design and assembly. Moreover, a brush passing over an irregularity in a power strip, such as a joint, scrapes both the brush and the track, causing wear to both. A wheel can more easily negotiate such irregularities, thereby reducing such wear.

The brush and wheel embodiment also provides for reduced electrical and sliding resistance as compared to the brush and stip embodiment. In that regard, a beneficial oxide layer that reduces both electrical and sliding resistance develops more easily and quickly between a brush and wheel contact than between a brush and extended power strip contact, again because of the more contained nature of the contact. That is, for a given linear movement of a robotic device, a brush covers much more of the surface, and much of the same surface of a wheel than it covers on an extended linear conductive strip. This is particularly advantageous in reducing high brush resistance when the robotic device is traveling at low speeds.

The brush and wheel embodiment also generally reduces the spring loading forces required. In that regard, because of irregularities in a conductive strip, such as due to joints or seams, a high spring loading force is required to ensure contact is maintained between a brush and power strip, particularly over time as the brush wears. In contrast, with a brush and wheel, there are no irregularities in the point of contact between the brush and wheel. As a result, the spring force used to maintain contact between the brush and wheel can be reduced, which also reduces the drive force or power necessary to move the robotic device.

Still further, the brush and wheel embodiment also reduces track wear, since the rolling friction between the wheel and track creates less wear than the sliding friction between a brush and power strip. In that regard, the conductive strips in a brush and power strip embodiment must be made sufficiently thick to allow for wear due to brush contact over time. Moreover, as previously noted, spring loading forces for brushes in a brush and power strip embodiment must be sufficiently high to ensure contact is maintained between the brush and power strip over time as both wear. A brush and wheel embodiment eliminates these concerns and allows for the use of a more inexpensive track having less stringent design and assembly tolerances.

In either of the brush and power strip or brush and wheel embodiments, the power strip or conduction rails may be oriented horizontally, as shown in the Figures, or vertically, or in a combination of both. Indeed, a vertical track orientation may be preferred, particularly for curved track areas. In that regard, for example, an extended printed circuit board power strip of the type previously described can be easily bent to follow a curved track area if such a power strip is provided with a vertical orientation. In contrast, to follow a curved track with a such a power strip oriented horizontally, a curved printed circuit board may need to be specially manufactured. Moreover, as the radius of curvature of a curved track area decreases, skidding and wear of wheels increases on a horizontally oriented track. This can be alleviated by a vertically oriented track.

Again in either embodiment, the power conductors or strips may be provided in segments or sections that can be electrically connected together in a modular fashion, thereby extending the power conductors or strip substantially throughout a data storage library. Such sections may be joined together along the path or a guide rail on which a robotic device moves in the library. In that regard, it should be noted that in either embodiment, the segments or sections of power conductors or strips may be connected in an end to end fashion to provide for robotic device movement in a single dimension, or may be connected in a grid-like fashion to provide for robotic device movement in two dimensions and/or to provide power across multiple horizontal paths for robotic devices, which paths may be stacked vertically on top of each other, thereby providing for robotic device access to multiple media cartridge storage cells arranged in a two dimensional configuration of multiple rows and columns, such as a planar "wall" or "floor," or a curved or substantially cylindrical "wall." Still further, again in either embodiment, the segments or sections of power conductors or strips may be connected in such a fashion as to provide for robotic device movement in three dimensions.

When used in such fashions for power distribution, segmented power strips will be sensitive to alignment so as not to create a sloppy joint. A mis-aligned joint in the power strip may cause a brush to lose contact with a power strip due to bounce. Wear on the brushes and power strip pieces at the joints may also cause limited life of the joint.

As a result, a joint for such power strips is pre-loaded and overconstrained to cause the power strips in the robot guide rail to substantially align. Such a joint preferably includes conductors slightly longer than the supporting structure of the robot guide rail, so as to force adjoining conductors into contact at their ends as guide rails and conductors are assembled. In addition, adjoining ends of conductors are preferably beveled or angled such that a force urging the conductors together causes the conductors to slip laterally against each other, so as to again facilitate alignment at the joint. Such a bevel or angle also spreads out the wiping action of a brush as it traverses the joint, thereby prolonging the life of the joint and brush, and limiting any problems that may arise as a result of any small offset. Still further, the power strips are preferably pre-loaded or biased by a spring load, thereby causing the joint to stay in compression for the life of the joint.

Figure 11A:
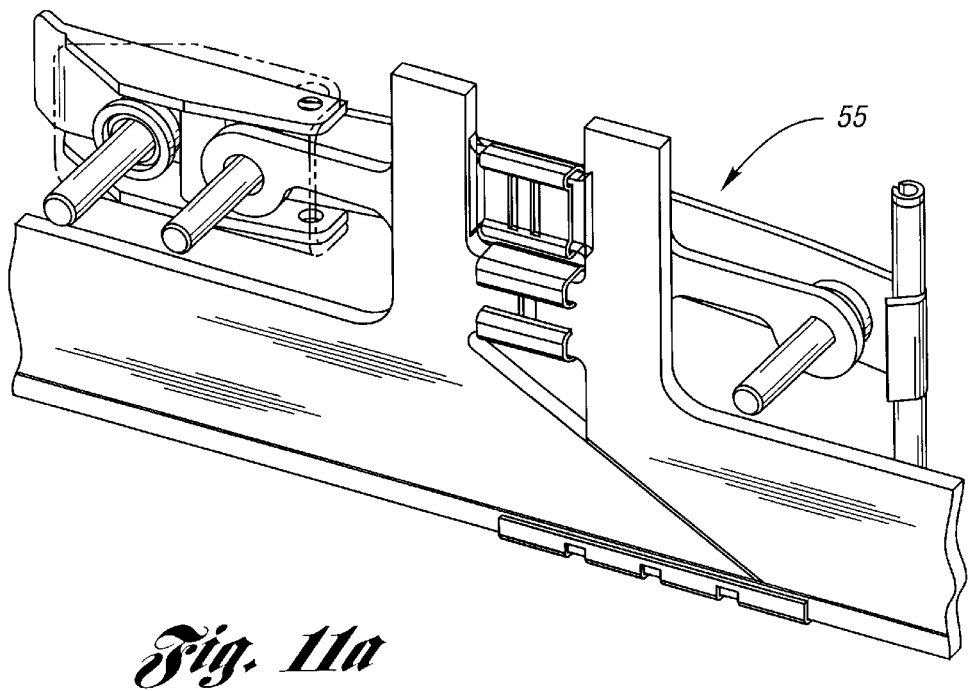
FIGS. 11a and 11b are additional perspective views of a power strip joint for use in an automated tape cartridge library according to the present invention.
Figure 11B:
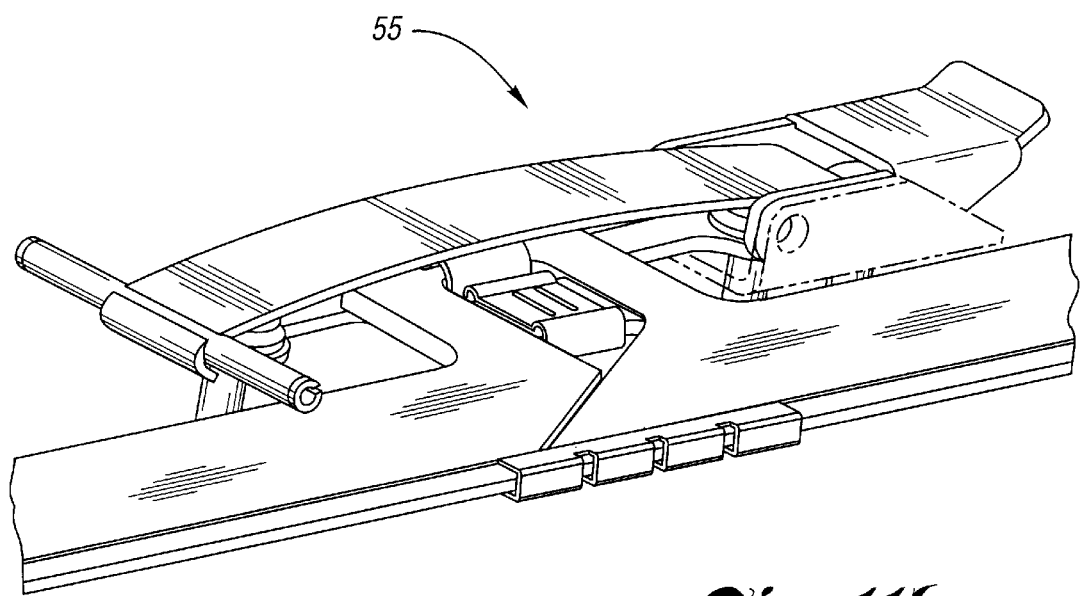

In that regard, referring next to FIGS. 9 through 10a–g, various perspective, cross-sectional and side views of a power strip and guide rail for use in an automated tape cartridge library according to the present invention are shown. As previously described, power strip sections in a brush and power strip embodiment may be sensitive to alignment. As seen in FIGS. 9–10g, guide rail sections (2A, 2B) are designed to accept substantially planar, elongated power strip sections (1A, 1B). In that regard, power strip sections (1A, 1B) are preferably of the printed circuit board type previously described, and preferably include upper (56) and lower (not shown) copper conductive layers on opposite surfaces of an FR4 type substrate material (58). Track alignment pins (50) and holes (52) in guide rail sections (2A, 2B) ensure that guide rails sections (2A, 2B) are properly aligned at the joint, and a joint bolt (54) is provided to ensure sufficient force to maintain the joint. In that regard, an alternative latch mechanism (55) is depicted in FIGS. 11a and 11b to provide sufficient force to maintain the joint.

Figure 12A:
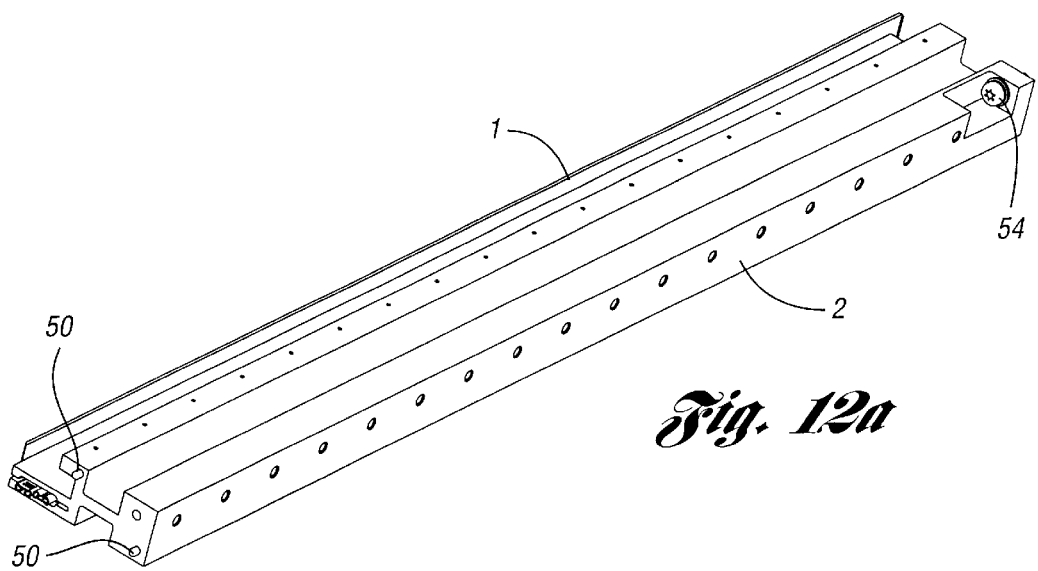
FIGS. 12a and 12b are perspective views of a guide rail sections for use in an automated tape cartridge library having brush and strip power distribution according to the present invention.
Figure 12B:
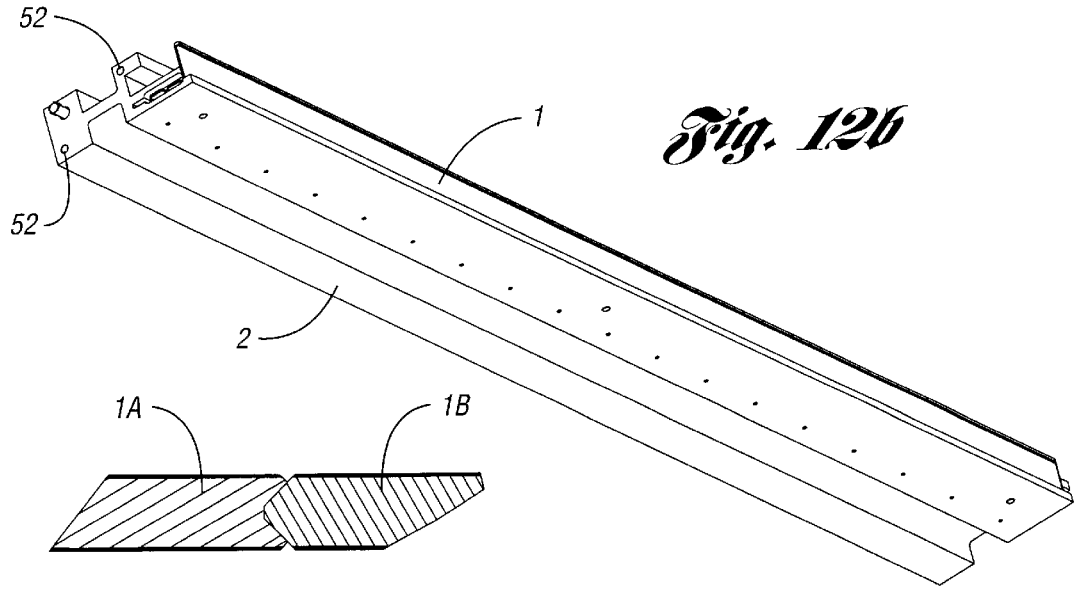
Figure 12C:
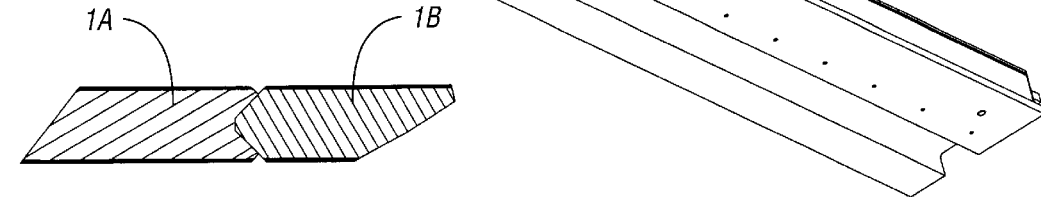
Figure 12B:
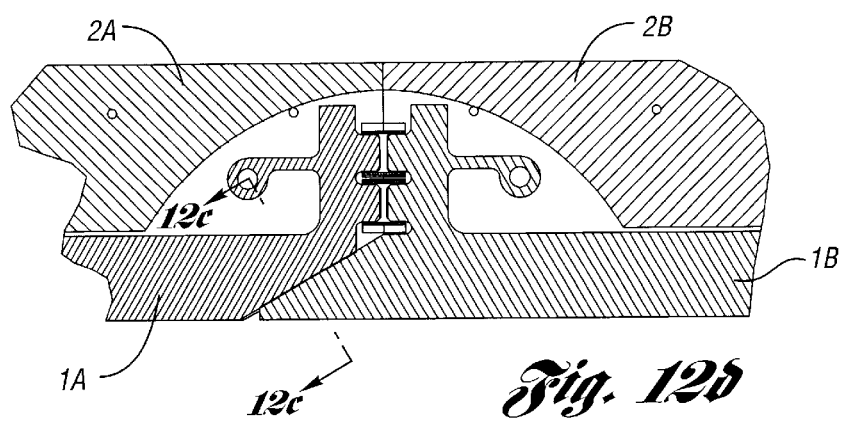

Power strips (1A, 1B) are preferably beveled or angled (preferably at 30°) in a complimentary fashion at adjoining ends so that such ends will move or slide laterally relative to each other in the X-Y plane during assembly of the joint, thereby accounting for varying tolerances in the lengths of adjoining power strips (1A, 1B) and/or guide rails (2A, 2B). In that same regard, power strips (1A, 1B) are preferably each provided with spring arms (60), which act as means for biasing power strips (1A, 1B) together against such lateral motion. Spring arms (60) preferably include mounting pin holes (62) formed therein, which are designed to align with similar mounting pin holes (64) formed in guide rails (2A, 2B) for receipt of mounting pins (66). Such a configuration facilitates the previously described relative lateral motion between power strips (1A, 1B) in the X-Y plane during assembly, and helps to ensure that power strips (1A, 1B) remain in contact after assembly. A similar spring arm, mounting pin hole and mounting pin arrangement (67) is preferably provided in a central region of each power strip (1) and guide rail (2) section (see FIG. 12e).

Power strips (1A, 1B) are also preferably provided at their adjoining ends complimentary tongue-and-groove like or dove tail type mating edges or surfaces. Such edges, preferably formed with 45° angles, ensure that power strips (1A, 1B) remain co-planer at the joint (i.e., refrain from movement relative to each other in the Z direction) so as not to expose an edge of an upper (56) or lower (not shown) conductive layer. Electrical connection is provided at the joint through the use of quick connect electrical slide type connectors (3A, 3B). In that regard, upper (56) and lower (not shown) conductive layers of adjoining power strips (1A, 1B) each preferably include an electrical connection point. Upon assembly of power strips (1A, 1B), such electrical connection points are proximate each other such that one connector (3A) creates an electrical connection between upper conductive layers (56) of adjoining power strips (1A, 1B), while the other connector (3B) creates an electrical connection between lower conductive layers (not shown) of adjoining power strips (1A, 1B).

In such a fashion, power strips (1A, 1B) are assembled to create a joint where their respective conductive layers are proximate such that a robotic device having brush or wiper type contacts as previously described maintains electrical contact therewith as the robotic device traverses the joint. A well aligned power strip and guide rail joint is thus provided which facilitates easy movement of a brush or wiper contact thereacross, while at the same time accounting for differing manufacturing tolerances and expansion rates between the dissimilar materials used in the power strips (1) and guide rails (2). It should also be noted that while depicted in the figures in conjunction with printed circuit type power strips (1), such features may be used with any type of power strip (1) previously described, or with any other type of joint for power conductors, such as a single conductive strip or bus bar. Indeed, many of the above features may also be used with any type of joint, such as between guide rails without power.

As is well known in the art, robotic devices in an automated tape cartridge library must be able to communicate with a host controller. This is typically done using multiple conductors (three or more) including power, ground, and signal(s), which can cause many of the same cabling problems previously described. The relatively high cost and low reliability of conductors and connectors pose a problem for implementing high reliability, low cost automated robotic data storage libraries. Such a problem is particularly troublesome if the space available for routing such conductors is limited.

Such problems can be overcome by using the oppositely charged conductive layers of a power strip, power rails, or a cable pair to supply not only power to the robotic devices, but communication signals between the robotic devices and a host controller as well. In that regard, in a brush and power strip embodiment, multiple conductors are particularly problematic when power and communication signals need to be sent to robotic devices via the power strip and brushes. Since the reliability of the electrical connections in such an embodiment is inherently relatively low, a substantial reliability and complexity penalty may be incurred when multiple conductors are used.

According to the present invention, a smaller, lower cost and higher reliability system is made possible by eliminating all conductors except those absolutely needed: power and ground. Information which would otherwise be communicated via dedicated signal conductors is instead modulated onto the power conductor. In such a fashion, the communication signals share the same conductor that is used to power the robotic device. Modulator circuits on a host controller and the robotic devices encode the data from the eliminated conductors and impress a modulated signal onto the power conductor. Demodulator circuits on both ends receive and recover the communication signals, translating the data back into its original form. High-speed full-duplex communication is thus implemented without the need for more than two conductors connecting the host controller and the remote robotic devices.

Figure 13:
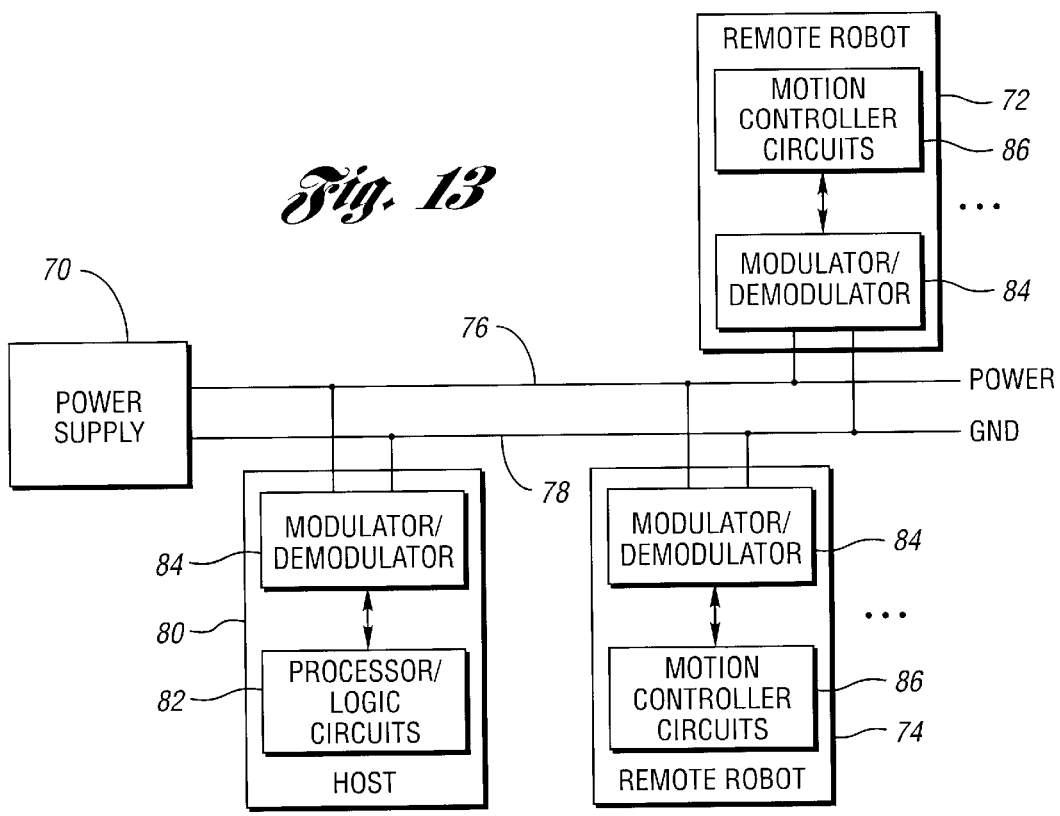
FIG. 13 is a simplified block diagram illustrating distribution of communication signals to and from robotic devices for use in an automated tape cartridge library according to the present invention.

Referring now to FIG. 13, a simplified block diagram illustrating distribution of communication signals to and from robotic devices (72, 74) for use in an automated tape cartridge library according to the present invention is shown. As seen therein, a power supply (70) provides power to robotic devices (72, 74) via power and ground conductors (76, 78), which are preferably the oppositely charged conductive layers of a power strip as described in detail above. A host controller (80), using processor and logic circuits (82), generates signals for use in controlling the movement and operations of robotic devices (72, 74). Host controller (80) is also provided with modulator/demodulator circuitry (84) to encode such communication signals and impress or superimpose such signals onto the power signal provided to the robotic devices (72, 74) via the power conductors (76, 78). Similar modulator/demodulator circuitry (84) is provided onboard robotic devices (72, 74) to recover and decode the signals from host controller (80). Once recovered and decoded, such signals are transmitted to motion controller circuitry (86) onboard robotic devices (72, 74) in order to effect the desired movement and operation of the robotic devices (72, 74).

Robotic devices (72, 74) communicate with host controller (80) in the same fashion, thereby providing feedback to the host controller (80) concerning movement and operation of the robotic devices (72, 74), which information the host controller (80) may use to generate further control signals. In that regard, such communication signals may be combined with the power signal in any fashion known in the art. For example, because power signals are typically lower frequency signals, communication signals may comprise higher frequency signals so that the power signal may be filtered out by robotic devices (72, 74) and host controller (80) using high-pass filters to thereby recover the communication signals. In such a fashion, high-speed full duplex communication may be implemented between the host controller (80) and robotic devices (72, 74) without the need for multiple conductors, cabling, or wireless connection.

Electromagnetic interference and unintended signal emissions can be a problem when transmitting communication signals between robotic devices and a host controller using the oppositely charged conductive layers of a power strip as described above. This can be particularly true for power conductors that are quite long. Interference from radio, television, and other radio frequency (RF) electromagnetic radiation sources, whether or not intentionally emitted, can interfere with the communication signals modulated onto the power conductors. Such interference can cause data transmission errors and slow the maximum attainable rate of data transfer.

In that same regard, when communication signals are modulated onto a long power conductor, some of the RF energy can radiate through the air and interfere with nearby independent power conductors. If the nearby power conductors also contain modulated communication signals, harmful interference can result. The energy radiated by the modulated power conductors may also cause interference in radio and television broadcast bands, or other restricted RF bands. Such interference may be prohibited by government regulations.

According to the present invention, the electromagnetic compatibility (EMC) of the brush and power strip embodiment of the present invention is improved by the orientation of the power strip conductors. As will be described in greater detail below, positive and negative (ground) conductors are preferably separated by a thin layer of insulating dielectric. The positive conductor is preferably centered over the negative conductor. The negative conductor is preferably made wider than the positive conductor in order to minimize fringing of the electric filed due to the modulated communication signal. The thin dielectric minimizes the "loop area" of the conductors. The conductors themselves are flat and relatively thin in order to reduce their respective surface areas, thereby reducing "skin effect." All of the above features serve to improve the EMC of the brush and power strip embodiment.

Figure 14:
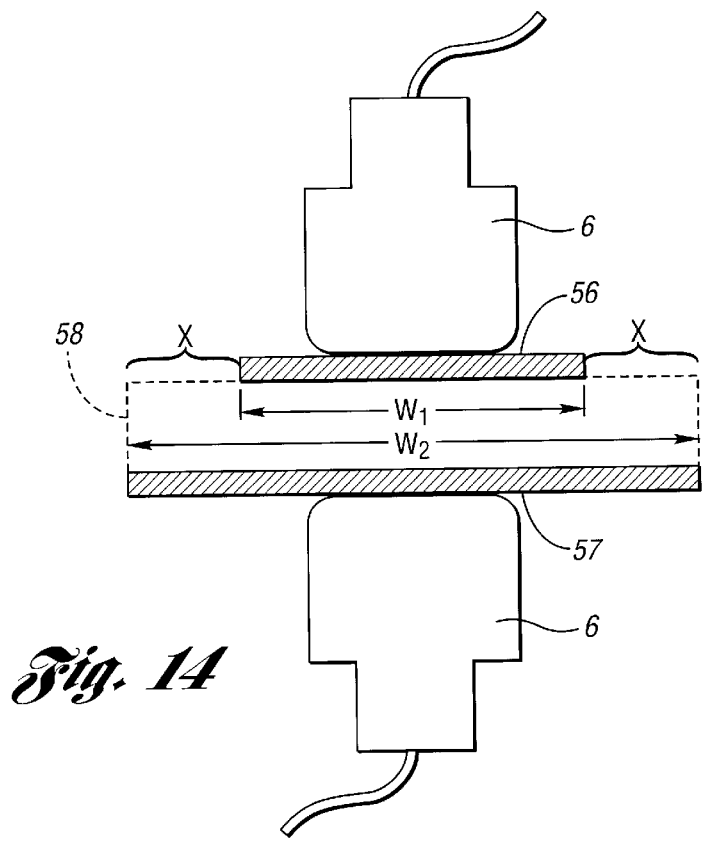
FIG. 14 is a cross-sectional view of a power strip and conductive brushes for use in an automated tape cartridge library according to the present invention.
Figure 15:
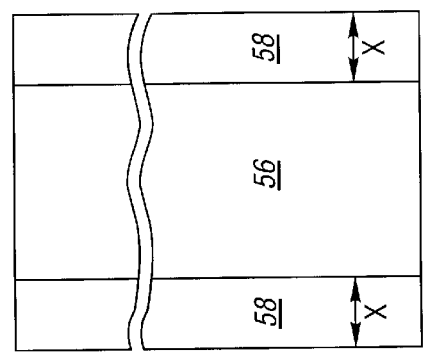
FIG. 15 is a top view of a power strip for use in an automated tape cartridge library according to the present invention.

Referring next to FIGS. 14 and 15, cross-sectional and top views of the power strip for use in an automated tape cartridge library according to the present invention are shown. As seen therein, one conductive layer (56), which is shown in the figures as positively charged or a power conductor, is preferably provided with a narrower width, $w_1$, than the width, $w_2$, of the other conductive layer (57), which is shown in the figures as negatively charged or a ground conductor. A thin dielectric material (58) is provided between conductive layers (56, 57), and has a width, $w_2$, that is preferably substantially equal to that of conductive layer (57). While not required, conductive layer (56) is preferably centered on the surface of one side of dielectric material (58), at equal distances, x, from the edges of dielectric material (58). In that regard, as previously described, conductive layers (56, 57) are preferably copper. Dielectric material (58) preferably has a low dielectric constant, k, such as FR4 previously described, or Teflon.

The above-described configuration serves to improve the electromagnetic compatibility (EMC) of the power strip. More particularly, the different widths of the conductive layers (56, 57) helps to minimize fringing of the electric field due to the modulated communication signals. In that regard, the greater the distance x can be made, either by narrowing conductive layer (56) or by widening conductive layer (57) and dielectric (58), the greater the beneficial effect on fringing. Conductive layers (56, 57) should, however, maintain sufficient width to allow adequate contact with brushes (6) in order to supply power to a robotic device.

Moreover, as is well known in the art, electrical current is generally forced to the outside surfaces of a conductor, particularly at higher frequencies. Conductors having less surface area therefore have higher resistance, a phenomenon generally referred to as "skin effect." By making conductive layers (56, 57) generally flat and thin, more surface area is created, thereby reducing resistance for the higher frequency communication signals. Such lowered resistance in turn reduced signal loss, thereby allowing for the use of longer tracks, while at the same time improving signal integrity by providing better immunity from interference by other signals.

Figure 16A:
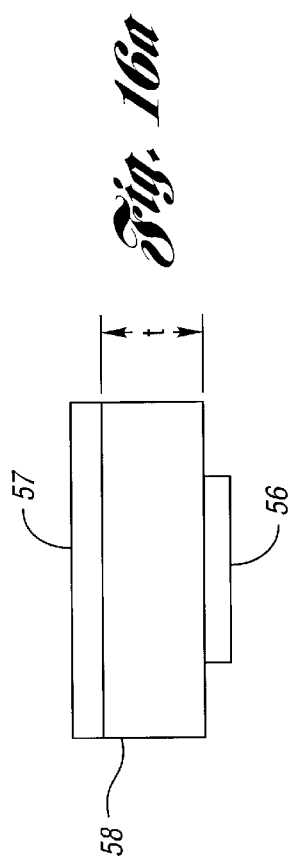
FIGS. 16a and 16b are a cross-sectional view and a simplified electrical schematic, respectively, of a power strip for use in an automated tape cartridge library according to the present invention.
Figure 16B:
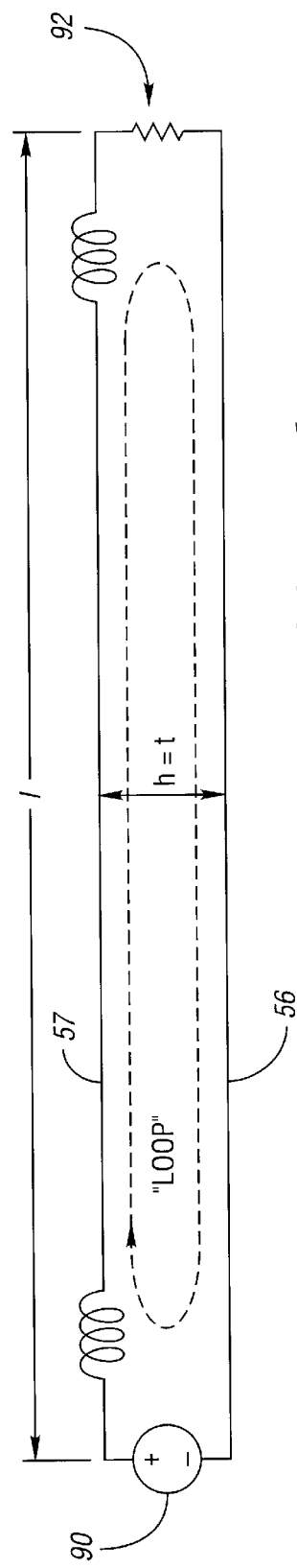

Still further, a thin dielectric (58) helps to minimize the "loop area" of the conductors (56, 57). In that regard, FIGS. 16a and 16b are a cross-sectional view and a simplified electrical schematic, respectively, of the power strip for use in an automated tape cartridge library according to the present invention. As seen therein, conductors (56, 57) are connected through a power supply (90) and a load (92), thereby creating a loop. While the length, l, of conductors (56, 57) is generally fixed, the thickness, t, of the dielectric (58) therebetween may be adjusted. That is, while the length (l) of the loop is generally fixed, its height (h) is adjustable. A thin dielectric (58) thus helps to reduce "loop area."

As previously noted, by minimizing fringing, "skin effect" and "loop area," the above-described configuration improves electromagnetic compatibility (EMC). In general, the above-described power rail presents a low impedance, thereby reducing coupling from interfering signals. In particular, minimizing fringing reduces the possibility that a communication signal on a power rail will interfere with other devices, including other power rails carrying other communication signals. Minimizing "skin effect" and "loop area" also reduces the possibility of such radiation type interference.

Figure 17:
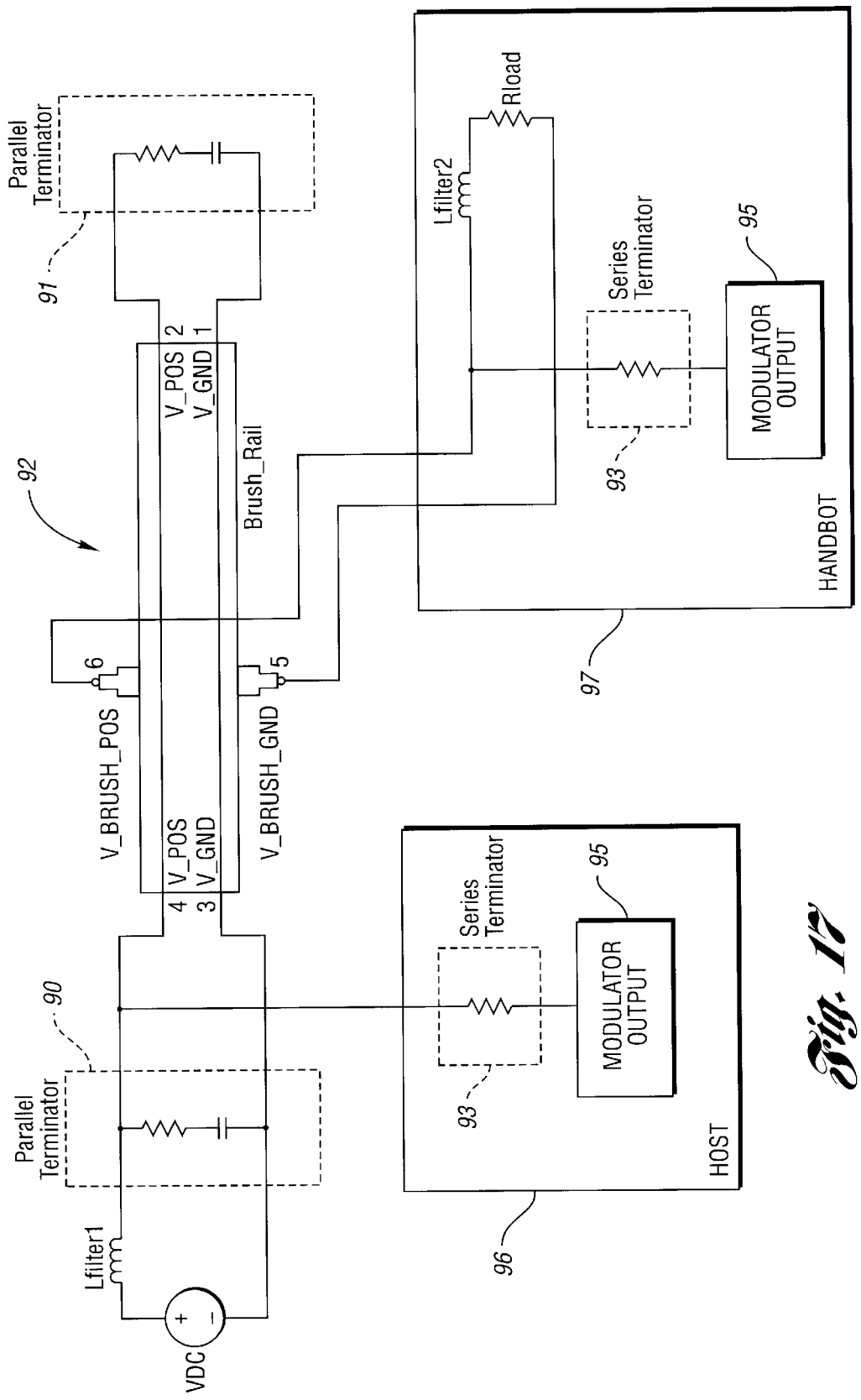
FIG. 17 is a simplified electrical schematic diagram illustrating a termination scheme for a line in a power strip or rail communication system.

In a power line communication system such as described above, signal reflections can pose a significant signal integrity problem. Reflections can destructively interfere with the communication signal, particularly when the length of the power line is long compared to the wavelength of the carrier signal. The reflection problem can be mitigated with the addition of line terminators at the extreme ends of the power line. In that regard, FIG. 17 is a simplified electrical schematic diagram illustrating a termination scheme for a line in a power strip or rail communication system according to the present invention. As seen therein, the termination scheme comprises two parallel terminators (90, 91) at each of the two ends of the power line/rail (92). As shown in FIG. 17, each terminator (90, 91) preferably comprises an RC termination, although those of ordinary skill will appreciate that a variety of termination schemes could be employed to achieve the same effect.

Still referring to FIG. 17, series terminators (93), which are preferably resistors, are also preferably provided on the output of each modulator circuit (95) for both the host controller (96) and the automated robot, or handbot (97). The combination of series termination and parallel termination further enhances the signal integrity of the power line (92). Either series or parallel termination could be used on its own, however. Proper line termination such as that depicted in FIG. 17 dramatically improves signal integrity and increases the maximum attainable rate of data transfer as well as extending the maximum length of the conductors.

Figure 18:
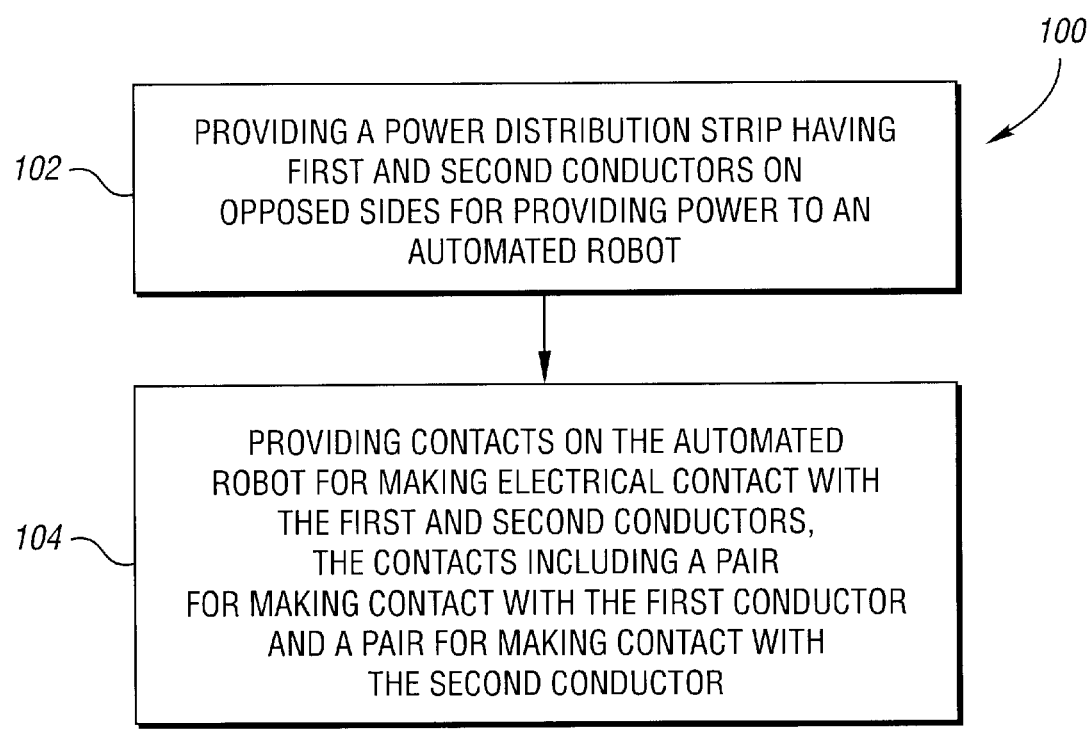
FIG. 18 is a simplified, exemplary flowchart depicting the method of the present invention.

Referring now to FIG. 18, a simplified, exemplary flowchart of the method of the present invention is shown, denoted generally by reference numeral 100. The method (100) is provided for use in a data storage library having a plurality of cells for holding media cartridges for use in storing data, at least one media drive, and a robotic device for transporting cartridges between the plurality of cells and the at least one media drive in the data storage library. The method (100) is for distributing electrical power to the automated robotic device and comprises providing (102) a power distribution strip comprising a substantially planar insulating member having opposed first and second sides, and first and second electrical conductors on the opposed first and second sides, respectively, for providing electrical power to the automated robotic device, the first and second conductors to be provided with opposite electrical charges. The method (100) further comprises providing (104) a plurality of contacts on the automated robotic device for making electrical contact with the first and second conductors, the plurality of contacts comprising a first pair of contacts for making electrical contact with the first conductor and a second pair of contacts for making electrical contact with the second conductor, wherein at least one of the first pair of contacts and at least one of the second pair of contacts maintain contact with the first and second conductors, respectively, as the automated robotic device moves in the data storage library.

It should be noted that the simplified flowchart depicted in FIG. 18 is exemplary of the method of the present invention. In that regard, the steps of such method may be executed in sequences other than those shown in FIG. 18, including the execution of one or more steps simultaneously.

Thus it is apparent that the present invention provides for an improved power distribution system and method for an automated robotic device for use in a data storage library. As is readily apparent from the foregoing description, the present invention overcomes the power distribution problems associated with prior art automated data storage libraries through the use of brush/wiper technology. A robotic device traveling over a given route uses a power distributor such as fixed conductive strips or rails to supply power to the robotic device, which itself is provided with brushes or wipers, or wheels and brushes that contact the conductive strips or rails in order to conduct power to the robotic device. Multiple brush or wheel pairs on each robotic device to improve robustness and reliability. The integration of such conductive strips or rails into the automated tape cartridge library, in conjunction with brush or wheel contacts provided on the robotic devices, allows for greater freedom of movement of the robotic devices, as well as for modular and extensible power distribution to robotic devices as library configurations change, or as libraries are connected in a modular fashion to form library systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a data storage library having a plurality of cells for holding media cartridges for use in storing data, at least one media drive, and an automated robotic device for transporting cartridges between the plurality of cells and the at least one media drive in the data storage library, a system for distributing electrical power to the automated robotic device, the system comprising:

a power distribution strip comprising a substantially planar insulating member having opposed first and second sides, and first and second electrical conductors on the opposed first and second sides, respectively, for providing electrical power to the automated robotic device, the first and second conductors to be provided with opposite electrical charges; and a plurality of contacts on the automated robotic device for making electrical contact with the first and second conductors, the plurality of contacts comprising a first pair of contacts for making electrical contact with the first conductor and a second pair of contacts for making electrical contact with the second conductor, wherein at least one of the first pair of contacts and at least one of the second pair of contacts maintain contact with the first and second conductors, respectively, as the automated robotic device moves in the data storage library.

2. The system of claim 1 wherein each of the plurality of contacts comprises an electrically conductive brush having a substantially flat surface for contacting a conductor.

3. The system of claim 2 wherein each brush is biased toward a conductor to facilitate maintaining contact therewith.

4. The system of claim 1 wherein each of the first pair of contacts for making contact with the first conductor contact a same portion of the first conductor in succession as the automated robotic device moves in the data storage library, and each of the second pair of contacts for making contact with the second conductor contact a same portion of the second conductor in succession as the automated robotic device moves in the data storage library.

5. The system of claim 1 wherein the automated robotic device has a first end and a second end, each of the first and second pairs of contacts comprises a first contact and a second contact, and the first and second contacts in each of the first and second pairs are provided in a spaced apart relationship where the first contacts of the first and second pairs are located proximate the first end of the automated robotic device and the second contacts of the first and second pairs are located proximate the second end of the automated robotic device.

6. The system of claim 1 wherein the power distribution strip comprises a plurality of sections, the plurality of sections to be electrically connected so that the power distribution strip extends substantially throughout the data storage library.

7. The system of claim 6 wherein the power distribution strip is adapted for use in communicating signals between the automated robotic device and a controller.

8. The system of claim 6 wherein the power distribution strip is adapted to be fed electrical power at a plurality of sections in the power distribution strip.

9. The system of claim 8 wherein the plurality of electrically connected sections of the power distribution strip have a first end and a second end, and the power distribution strip is adapted to be fed electrical power at both the first and second ends of the plurality of electrically connected sections.

10. The system of claim 6 further comprising a guide rail for supporting the automated robotic device during movement thereof in the data storage library, wherein the guide rail is adapted to support the power distribution strip.

11. In a data storage library having a plurality of cells for holding media cartridges for use in storing data, at least one media drive, and an automated robotic device for transporting cartridges between the plurality of cells and the at least one media drive in the data storage library, a method for distributing electrical power to the automated robotic device, the method comprising:

providing a power distribution strip comprising a substantially planar insulating member having opposed first and second sides, and first and second electrical conductors on the opposed first and second sides, respectively, for providing electrical power to the automated robotic device, the first and second conductors to be provided with opposite electrical charges; and providing a plurality of contacts on the automated robotic device for making electrical contact with the first and second conductors, the plurality of contacts comprising a first pair of contacts for making electrical contact with the first conductor and a second pair of contacts for making electrical contact with the second conductor, wherein at least one of the first pair of contacts and at least one of the second pair of contacts maintain contact with the first and second conductors, respectively, as the automated robotic device moves in the data storage library.

12. The method of claim 11 wherein each of the plurality of contacts comprises an electrically conductive brush having a substantially flat surface for contacting a conductor.

13. The method of claim 12 wherein each brush is biased toward a conductor to facilitate maintaining contact therewith.

14. The method of claim 11 wherein each of the first pair of contacts for making contact with the first conductor contact a same portion of the first conductor in succession as the automated robotic device moves in the data storage library, and each of the second pair of contacts for making contact with the second conductor contact a same portion of the second conductor in succession as the automated robotic device moves in the data storage library.

15. The method of claim 11 wherein the automated robotic device has a first end and a second end, each of the first and second pairs of contacts comprises a first contact and a second contact, and the first and second contacts in each of the first and second pairs are provided in a spaced apart relationship where the first contacts of the first and second pairs are located proximate the first end of the automated robotic device and the second contacts of the first and second pairs are located proximate the second end of the automated robotic device.

16. The method of claim 11 wherein the power distribution strip comprises a plurality of sections, the plurality of sections to be electrically connected so that the power distribution strip extends substantially throughout the data storage library.

17. The method of claim 16 wherein the power distribution strip is adapted for use in communicating signals between the automated robotic device and a controller.

18. The method of claim 16 wherein the power distribution strip is adapted to be fed electrical power at a plurality of sections in the power distribution strip.

19. The method of claim 18 wherein the plurality of electrically connected sections of the power distribution strip have a first end and a second end, and the power distribution strip is adapted to be fed electrical power at both the first and second ends of the plurality of electrically connected sections.

20. The method of claim 16 further comprising a guide rail for supporting the automated robotic device during movement thereof in the data storage library, wherein the guide rail is adapted to support the power distribution strip.

* * * * *